US012493385B2

(12) United States Patent
Wang et al.

(10) Patent No.: US 12,493,385 B2
(45) Date of Patent: Dec. 9, 2025

(54) METHOD FOR RECOGNIZING MATERIAL, INTERACTIVE BOARD, AND STORAGE MEDIUM

(71) Applicants: GUANGZHOU SHIYUAN ELECTRONIC TECHNOLOGY COMPANY LIMITED, Guangzhou (CN); GUANGZHOU SHIYUAN ARTIFICIAL INTELLIGENCE INNOVATION RESEARCH INSTITUTE CO., LTD., Guangzhou (CN)

(72) Inventors: Fei Wang, Guangzhou (CN); Cai Chen, Guangzhou (CN); Jianxin Lin, Guangzhou (CN)

(73) Assignees: GUANGZHOU SHIYUAN ELECTRONIC TECHNOLOGY COMPANY LIMITED, Guangzhou (CN); GUANGZHOU SHIYUAN ARTIFICIAL INTELLIGENCE INNOVATION RESEARCH INSTITUTE CO., LTD., Guangzhou (CN)

( * ) Notice: Subject to any disclaimer, the term of this patent is extended or adjusted under 35 U.S.C. 154(b) by 0 days.

(21) Appl. No.: 18/969,269

(22) Filed: Dec. 5, 2024

(65) Prior Publication Data
US 2025/0094003 A1    Mar. 20, 2025

Related U.S. Application Data

(63) Continuation of application No. PCT/CN2023/080607, filed on Mar. 9, 2023.

(51) Int. Cl.
*G06F 3/042* (2006.01)
*G06F 3/041* (2006.01)
(Continued)

(52) U.S. Cl.
CPC ........ *G06F 3/0421* (2013.01); *G06F 3/04142* (2019.05); *G06F 3/043* (2013.01);
(Continued)

(58) Field of Classification Search
CPC .............. G06F 3/0416; G06F 3/04166; G06F 3/0418–04186; G06F 3/042–0436
See application file for complete search history.

(56) References Cited

U.S. PATENT DOCUMENTS

| 10,402,017 B2 * | 9/2019 | Drumm ................. G06F 3/0421 |
| 2025/0094003 A1 * | 3/2025 | Wang ..................... G01N 23/00 |
| 2025/0126002 A1 * | 4/2025 | Wang ........................ G06F 3/03 |

FOREIGN PATENT DOCUMENTS

WO    WO-2022222384 A1 * 10/2022    .......... G05B 19/418

OTHER PUBLICATIONS

European Search Report issued in European application No. 23925792.6, mailed Jul. 11, 2025, 9 pages.

* cited by examiner

*Primary Examiner* — Patrick F Marinelli
(74) *Attorney, Agent, or Firm* — BAYES PLLC

(57) ABSTRACT

The present disclosure provides a method for recognizing a material, an interactive board, and a storage medium, which is applied to an interactive board, and the interactive board includes an operation panel, an infrared touch sensor, and an elastic wave sensor. The infrared touch sensor is arranged on at least one edge of the operation panel to form a touch detection region of the interactive board, and the elastic wave sensor is configured to detect vibration of the operation panel and generate an electrical signal.

18 Claims, 14 Drawing Sheets

(51) Int. Cl.
*G06F 3/043* (2006.01)
*G06N 3/084* (2023.01)
(52) U.S. Cl.
CPC ........... *G06N 3/084* (2013.01); *G06F 3/0416* (2013.01); *G06F 2203/04106* (2013.01)

METHOD FOR RECOGNIZING MATERIAL, INTERACTIVE BOARD, AND STORAGE MEDIUM

CROSS-REFERENCE TO RELATED APPLICATION

The present application is a continuation of International Application No. PCT/CN2023/080607, filed on Mar. 9, 2023. The entire content of the above-identified application is expressly incorporated herein by reference.

TECHNICAL FIELD

The present disclosure relates to the field of material recognition, and in particular to a method for recognizing a material, an interactive board, and a storage medium.

TECHNICAL BACKGROUND

Currently, for interactive devices such as tablets or display panels, interaction with users is mainly achieved through infrared touch sensitive displays or capacitive touch screens which are equipped in themselves. During the interaction process, perception of a material type of a touch object by the interactive device may only be determined based on a touch area of the touch object. However, when the touch area measurement is inaccurate or impossible, interactive devices are unable to accurately determine the material type of the touch object.

In summary, how to accurately determine the material of the touch object has become an urgent technical problem to be solved.

SUMMARY

According to embodiments of the present disclosure, a method for recognizing a material, an interactive board, and a storage medium are provided, so that it is possible to accurately recognize the material of a touch object, thereby solving a technical problem of interactive devices being unable to accurately recognize the material of the touch object in the related art.

According to a first aspect of an embodiment of the present disclosure, a method for recognizing a material is provided, which is applied to an interactive board, and the interactive board includes an operation panel, an infrared touch sensor, and an elastic wave sensor. The infrared touch sensor is arranged on at least one edge of the operation panel to form a touch detection region of the interactive board, and the elastic wave sensor is configured to detect vibration of the operation panel and generate an electrical signal. The method for recognizing the material includes:

generating an infrared blocking electrical signal by the infrared touch sensor from a first moment when a touch object performs touch operation in a touch detection region;

calculating an average energy value of the original touch electrical signals within a current time window;

calculating a ratio of the average energy value to an historical average energy value, where the historical average energy value is an average energy value of the original touch electrical signals within a previous time window;

determining whether the ratio is greater than a preset threshold;

acquiring an initial moment of the current time window as a starting moment of an effective touch electric signal if the ratio is greater than the preset threshold;

acquiring an effective touch electrical signal within a preset time length after the starting moment as elastic wave data; and determining first material information of the touch object based on the infrared blocking electrical signal and the elastic wave data.

According to a second aspect of an embodiment of the present disclosure, an interactive board is provided, which includes an operation panel, an infrared touch sensor, an elastic wave sensor, and at least one processing device. The infrared touch sensor is arranged on at least one edge of the operation panel to form a touch detection region of the interactive board, the elastic wave sensor is configured to detect vibration of the operation panel and generate an electrical signal, and at least one processing device is configured to:

generate an infrared blocking electrical signal by the infrared touch sensor from a first moment when a touch object performs touch operation in a touch detection region;

generate the elastic wave sensor by an original touch electrical signal from the first moment;

calculate an average energy value of the original touch electrical signals within a current time window;

calculate a ratio of the average energy value to an historical average energy value, where the historical average energy value is an average energy value of the original touch electrical signals within a previous time window;

determine whether the ratio is greater than a preset threshold;

acquire an initial moment of the current time window as a starting moment of an effective touch electric signal if the ratio is greater than the preset threshold;

acquire the effective touch electrical signal within a preset time length after the starting moment as elastic wave data; and determine first material information of the touch object based on the infrared blocking electrical signal and elastic wave data.

According to a third aspect of an embodiment of the present disclosure, a storage medium storing computer executable instructions is provided. The computer executable instructions, when executed by a computer processor, perform the method for recognizing the material as described in the first aspect.

As mentioned above, according to the embodiment of the present disclosure, a method for recognizing a material, an interactive board, and a storage medium are provided. The method is applied to an interactive board, and the interactive board includes an operation panel, an infrared touch sensor, and an elastic wave sensor. The infrared touch sensor is arranged on at least one edge of the operation panel to form a touch detection region of the interactive board, and the elastic wave sensor is configured to detect vibration of the operation panel and generate an electrical signal. The method for recognizing the material includes: generating an infrared blocking electrical signal by the infrared touch sensor from a first moment when a touch object performs touch operation in a touch detection region; calculating an average energy value of the original touch electrical signals within a current time window; calculating a ratio of the average energy value to an historical average energy value, where the historical average energy value is an average energy value of the original touch electrical signals within a previous time window; determining whether the ratio is greater than a preset threshold; acquiring an initial moment of the current time window, and using the initial moment of the current time window as a starting moment of an effective touch electric signal if the ratio is greater than the preset threshold; acquiring the effective touch electrical signal within a preset time length after the starting moment as elastic wave data; and determining first material information of the touch object based on the infrared blocking electrical signal and the elastic wave data.

The embodiment of the present disclosure can improve an accuracy of recognizing the material by combining the infrared blocking electrical signal with the original touch electrical signal, which overcomes a low material recognition rate caused by lack of material specificity in infrared blocking electrical signals and susceptibility of original touch electrical signals to vibration interference, thereby solving a technical problem that interactive boards are unable to accurately recognize the material of touch objects in related art.

REFERENCE NUMERALS

Figure 1A:
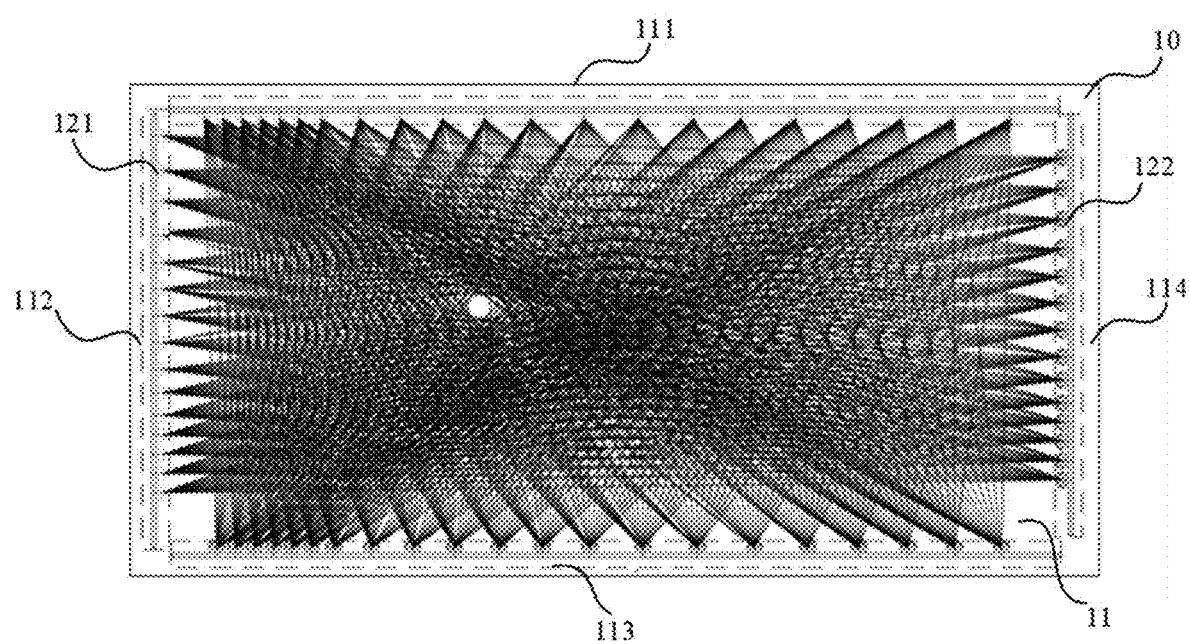
FIG. 1A is a structural schematic diagram of an infrared touch sensitive display screen according to an embodiment of the present disclosure.

Infrared touch sensitive display screen 10, Operation panel 11, Infrared touch sensor 12, First border 111, Second border 112, Third border 113, Fourth border 114, Infrared transmitter 121, Infrared receiver 122, First touch state 131, Second touch state 132, Third touch state 133, Fourth touch state 134, Fifth touch state 135, Capacitive touch screen 14, Elastic wave sensor 15.

DETAILED DESCRIPTION

The following description and accompanying drawings illustrate the specific implementation scheme of the present disclosure to enable those skilled in the art to practice them. Embodiments only represent possible changes. Unless explicitly required, individual components and functions are optional, and the sequence of operations may vary. The parts and features of some implementation solutions may be included or replaced by the parts and features of other implementation solutions. The scope of the implementation solutions of the present disclosure includes the entire scope of the claims, as well as all available equivalents of the claims. In this description, relational terms such as first and second are only used to distinguish one entity or operation from another entity or operation, without requiring or implying any actual relationship or order between these entities or operations. Moreover, the terms "including," "comprising," or any other variation thereof are intended to cover non-exclusive inclusion, so that a process, method, or device that includes a series of elements not only includes those elements, but also other elements that are not explicitly listed. The various embodiments in this description are described in a progressive manner, and each embodiment focuses on the differences from other embodiments. The same and similar parts between each embodiment may be referred to each other. For the structure, products, etc. disclosed in the embodiments, as they correspond to the disclosed parts of the embodiments, the description is relatively simple. Relevant information may be referred to the section of the method.

Interactive devices refer to devices that may exchange information with users in a certain interactive way, such as mobile phones or tablets, which may exchange information with users through gesture recognition. At present, when interactive devices recognize a type of a touch object, the interactive devices usually use their own infrared touch sensitive display screen or capacitive touch screen to achieve recognition of the type of touch object. Touch objects refer to objects that contact with interactive devices, such as chalk, eraser, marker, conference pen, stylus, or fingers. Infrared touch sensitive display screen refers to a touch display screen equipped with an infrared touch sensor. For example, as shown in FIG. 1A, an infrared touch sensitive display screen 10 includes an operation panel 11 and an infrared touch sensor, and the infrared touch sensor is arranged on at least one edge of the operation panel 11 so as to form a touch detection region. Therein, the operation panel 11 includes a first border 111, a second border 112, a third border 113, and a fourth border 114. Therein, the first border 111 is located at the top, hence also known as a sky side, the third border 113 is located at the bottom, hence also known as a ground side, the second border 112 and the fourth border 114 are located on opposite sides, hence the second border 112 is also known as a left side, and the fourth border 114 is also known as a right side. The infrared touch sensor includes an infrared emitter 121 and an infrared receiver 122. In an embodiment, the infrared emitter 121 of a set of infrared touch sensors is arranged on the first border 111, and the infrared receiver 122 is arranged on the third border 113. The infrared transmitter 121 of another set of infrared touch sensors is arranged on the second border 112, and the infrared receiver 122 is arranged on the fourth border 114. Therein, the infrared transmitter 121 is configured to emit infrared ray, and the infrared receiver 122 is configured to receive infrared. When the infrared ray emitted by the infrared transmitter 121 is blocked, causing the infrared receiver 122 to be unable to receive infrared ray, it may be determined that there is an obstruction between the infrared transmitter 121 and the infrared receiver 122. Therefore, based on a range covered by the infrared ray emitted by all infrared touch sensors (as shown in a straight line in FIG. 1A), a detection range of the infrared touch sensor may be determined, and a corresponding touch detection region may be determined in the infrared touch sensitive display screen based on the detection range. Therein, the touch detection range refers to the range within which the touch object may be detected during touch operation on the operation panel. Understandably, a size and position of the touch detection range are determined by the number of infrared touch sensors and the position of the infrared touch sensors.

When the infrared touch sensitive display screen is working, the infrared transmitter 121 of the infrared touch sensor emits infrared ray at a set frequency, and the infrared receiver 122 receives infrared ray. This process is called a scanning process of the infrared touch sensor. In this embodiment, when the touch object enters the touch detection region, if the infrared ray emitted by the infrared touch sensor is blocked by the touch object, an electrical signal received by the infrared receiver 122 in the infrared touch sensor changes, so that an infrared blocking electrical signal is generated. By analyzing the infrared blocking electrical signal, information such as a position of the touch object and an area of the touch object may further be acquired. In an embodiment, an infrared processor is installed inside the interactive board, which, together with the infrared touch sensor, is called an infrared touch frame. The infrared processor is a microcontroller unit (MCU) that is matched with the infrared touch sensor, such as 811 System on Chip (SOC). In the case where the infrared processor has a logical processing ability of infrared blocking electrical signals, the infrared processor may provide touch processing services for upper layer applications based on infrared blocking electrical signals, that is, the infrared processor may process the infrared blocking electrical signals scanned by the infrared touch sensor on the touch object, for example, calculating at least one of the following data: appearance coordinates of the touch object (X coordinate, Y coordinate), width and height, (marking) appearance time of the touch object, a cross-sectional area of the touch object, and the like, to form a touch data packet (i.e. touch point data).

In an embodiment, the interactive board is further built-in with a central processing unit, and USB components such as USB HUB, USB switch, and USB Redriver (Signal Repeater) are arranged between the CPU and the infrared processor. The CPU may serve as Human Interface Device (HID), and the infrared processor communicates with CPU through USB components. When the infrared processor generates a touch data packet, the touch data packet is transmitted to the central processing unit, which then reports the touch data packets to an upper application of an operating system.

It should be noted that in some models of interactive boards, the central processing unit has the logical processing ability of infrared blocking electrical signals. At this time, the CPU may provide touch processing services for upper level applications based on the infrared blocking electrical signals. That is, the infrared processor uploads the infrared blocking electrical signal to CPU, and CPU may process the infrared blocking electrical signal scanned by the infrared touch sensor on the touch object, for example, CPU may calculate appearance coordinates of the touch object (X coordinate, Y coordinate), calculate the width and height, mark appearance time of the touch object, and calculate a cross-sectional area of the touch object, to form a touch data packet (i.e. touch point data).

Figure 1B:
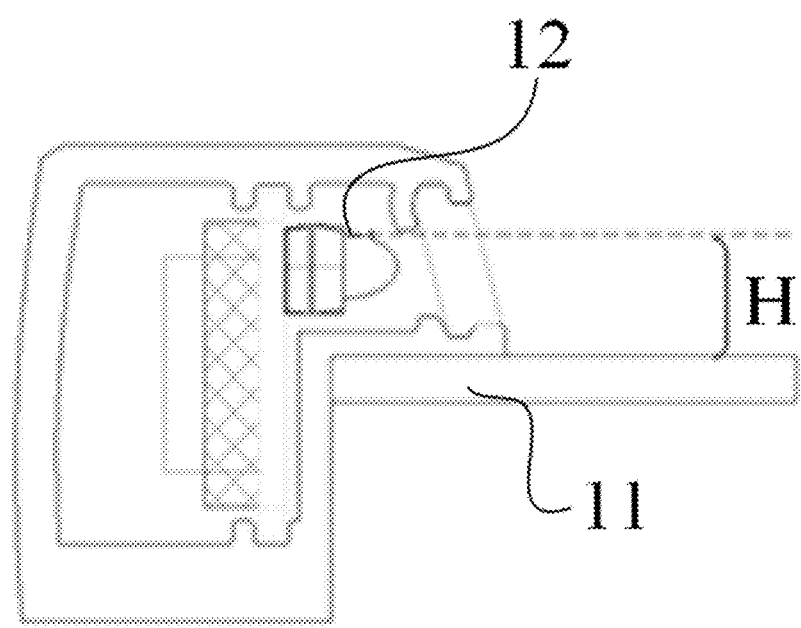
FIG. 1B is a local structural schematic diagram of an infrared touch sensitive display screen according to an embodiment of the present disclosure.

It should be further noted that, as shown in FIG. 1B, in general, due to the infrared touch sensor 12 being higher than a surface of the operation panel 11 (also known as a cover plate), the infrared touch sensor 12 transmits light through a filter strip (also known as a filter). The filter strip is usually made by injection molding or casting after adding dye to the original material. The filter strip may transmit infrared ray while filtering out other ambient light, so as to improve a signal-to-noise ratio of infrared blocking electrical signals, infrared ray scanned by the infrared touch sensor 12 on the surface of the operation panel 11 is within a certain height range, therefore, the infrared touch sensor 12 forms a touch detection region in a vertical direction of the operation panel 11, with a height of H, which is generally greater than 2 mm (millimeters) and cannot be ignored.

Figure 1C:
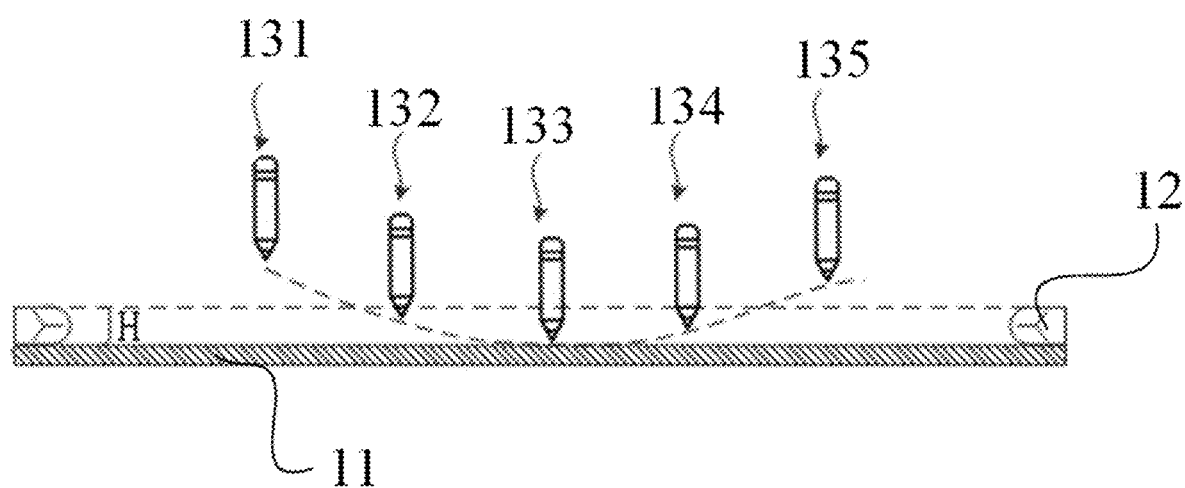
FIG. 1C is a schematic diagram of a touch object under different touch states according to an embodiment of the present disclosure.

A process of realizing the touch function of an interactive board with an infrared touch sensitive display screen: when a touch object (such as a hand or pen) is writing on the operation panel, the touch object is first pressed in a general process, and is moved when touching the surface of the operation panel, and finally the touch object is lifted. As shown in FIG. 1C, from a first touch state 131, a second touch state 132, a third touch state 133, a fourth touch state 134 to a fifth touch state 135, it is described a part of processing operations of the infrared touch sensitive display screen when a touch object is pressed (Down), moved (Move), and lifted (Up) in one touch operation.

In the first touch state 131, the touch object begins to be pressed and is located above the touch detection region, that is, a distance between the touch object and a plane on which the surface of the operation panel 11 is located is greater than H. The infrared ray during the scanning process of the infrared touch sensor 12 is not blocked by the touch object and does not generate an infrared blocking electrical signal. At this time, the infrared processor or central processing unit does not report the touch point data.

In the second touch state 132, the touch object continues to be pressed and is located in the touch detection region, without touching the surface of the operation panel 11. That is, the distance between the touch object and the plane on which the surface of the operation panel 12 is located is greater than 0 and less than H. The infrared ray during the scanning process of the infrared touch sensor 12 is blocked by the touch object, so that an infrared blocking electrical signal is generated. At this time, the infrared processor or central processing unit reports touch point data based on infrared blocking electrical signals.

In the third touch state 133, the touch object is in the touch detection region and has touched the surface of the operation panel 11. The touch object may be moved on the surface of the operation panel 11, that is, the distance between the touch object and the plane where the surface of the operation panel 11 is located is less than or equal to 0 (less than 0 indicates that a phenomenon of the surface of the operation panel 11 being concave under a force of the touch object).

Obviously, the distance between the touch object and the plane on which the surface of the operation panel 11 is located is less than H. At this time, the infrared ray during a scanning process of the infrared touch sensor 12 is blocked by the touch object, an infrared blocking electrical signal is generated. The infrared processor or central processing unit reports touch point data based on the infrared blocking electrical signal.

In the fourth touch state 134, the touch object begins to be lifted and is in the touch detection region, without touching the surface of the operation panel 11. That is, the distance between the touch object and the plane where the surface of the operation panel 11 is located is greater than 0 and less than H. The infrared ray during the scanning process of the infrared touch sensor 12 is blocked by the touch object, and an infrared blocking electrical signal is generated. At this time, the infrared processor or central processing unit reports touch point data based on infrared blocking electrical signals.

In the fifth touch state 135, the touch object continues to be lifted and is above the touch detection region. That is, the distance between the touch object and the plane on which the surface of the operation panel 11 is located is greater than H. The infrared ray during the scanning process of the infrared touch sensor 12 is not blocked by the touch object, so that no infrared blocking electrical signal is generated. At this time, the infrared processor or central processing unit reports no touch point data.

Therefore, when the infrared touch sensor 12 first scans the touch object, the touch object does not contact with the operation panel 11. The touch object still needs to move vertically towards the operation panel 11 at a height H before contacting with the operation panel 11. When the infrared touch sensor 12 first scans the touch object, it takes a period of time before the touch object may touch the operation panel 11. If the infrared touch sensor 12 has not touched the operation panel 11 for a period of time after the first scan of the touch object, it indicates that the touch object may have accidentally entered the touch detection region of the infrared touch sensor 12, rather than needing to perform touch operations on the operation panel 11. In this case, even in the second touch state 132 mentioned above, the infrared ray scanned by the infrared touch sensor 12 is blocked by the touch object, and the infrared touch sensor 12 generates an infrared blocking electrical signal. At this time, the infrared processor or central processing unit still reports the touch point data. That is, when the touch object is writing on the operation panel of the infrared touch sensitive display screen, touch point data has been generated when the touch object entered the touch detection region of the infrared touch sensor 12 but not touching the operation panel.

Figure 2:
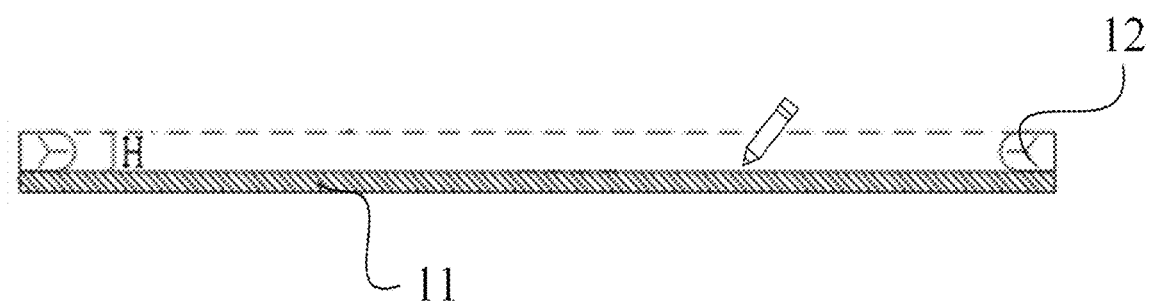
FIG. 2 is a schematic diagram of a touch object obliquely contacting with an operation panel according to an embodiment of the present disclosure.

In addition, the current manner of determining an area of a touch object based on touch point data is only applicable when the touch object is in vertical contact with the operation panel 11. When the touch object touches obliquely the operation panel, the range of infrared ray blocked by the touch object is too large, as shown in FIG. 2, which leads to an increase in the area of the touch object determined based on touch point data, resulting in incorrect recognition of the type of touch object.

Figure 3:
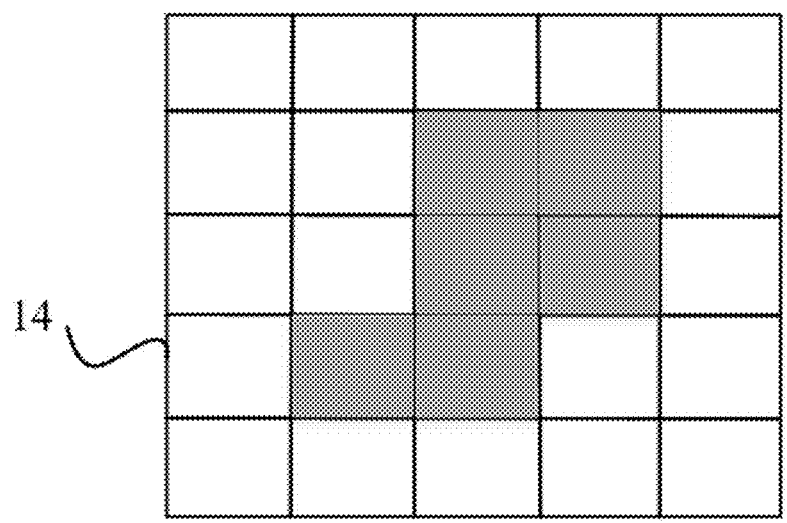
FIG. 3 is a schematic diagram of a principle of inspecting a touch object by a capacitive touch screen according to an embodiment of the present disclosure.

In another case, when a capacitive touch screen is installed on the interactive device, users currently use capacitive touch operations uniformly on the interactive device, that is, press the touch object until it touches the surface of the screen, thereby achieving touch operations on the interactive device. As shown in FIG. 3, FIG. 3 is a structural schematic diagram of the capacitive touch screen 14. When the touch object contacts with a metal layer of the capacitive touch screen 14, capacitance at a contact point on the metal layer changes, as shown in a grid having a darker gray in FIG. 3, a frequency of an oscillator connected to the metal layer is changed. By measuring a frequency change of the oscillator, the position of the touch point and the area of the touch object may be determined, so that the subsequent interactive device may determine the type of touch object based on the area. However, when the touch object is an insulated touch object, the capacitive touch screen 14 cannot effectively recognize the touch object, nor can it recognize the area of the touch object, so that the type of touch object is easily recognized incorrectly. In another embodiment, when the touch object in contact with the capacitive touch screen is an active capacitive pen, the position detection circuit inside the active capacitive pen determines position information of the active capacitive pen on the capacitive touch screen by collecting electrical signals on the capacitive touch screen, and sends the position information to the interactive device. At the same time, the interactive device may further determine the type of active capacitive pen based on the signal sent by the active capacitive pen. However, this method requires the touch object to be an active device, and the touch object further needs to have a function of sending signals to interactive device, which is difficult to achieve and cannot be suitable for most usage scenarios.

Figure 4:
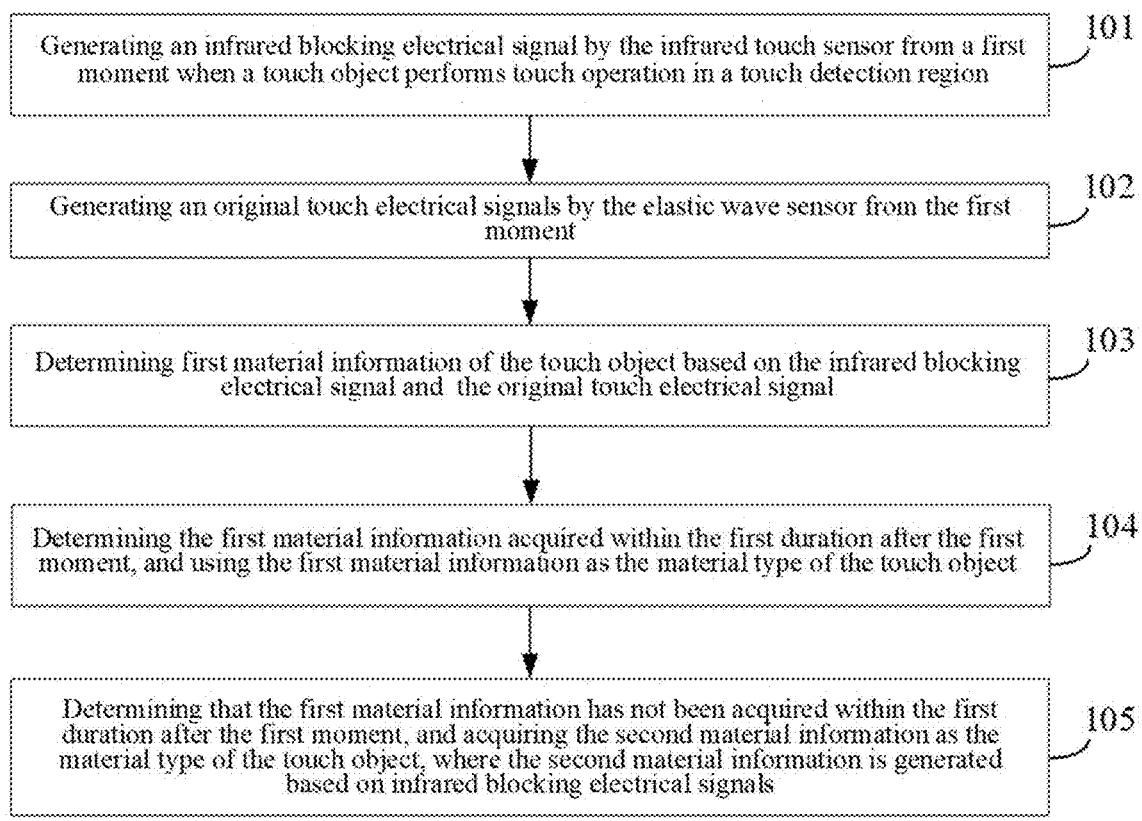
FIG. 4 is a flowchart of a method for recognizing a material according to an embodiment of the present disclosure.

Based on this, according to the embodiment of the present disclosure, a method for recognizing a material is provided, as shown in FIG. 4, and FIG. 4 is a flowchart of a method for recognizing a material according to an embodiment of the present disclosure. The method for recognizing the material according to the embodiment of the present disclosure may be implemented by a device for recognizing a material, which may be realized by software and/or hardware. The device for recognizing the material may include two or more physical entities, or may include one physical entity. For example, the device for recognizing the material may be interactive devices such as mobile phones, interactive boards, and display boards. The method for recognizing the material according to an embodiment of the present disclosure is used for an interactive board, and the interactive board includes an operation panel, an infrared touch sensor, and an elastic wave sensor. The infrared touch sensor is arranged on at least one edge of the operation panel so as to form a touch detection region of the interactive board, and the elastic wave sensor is configured to detect vibration of the operation panel and generate an electrical signal.

Figure 5:
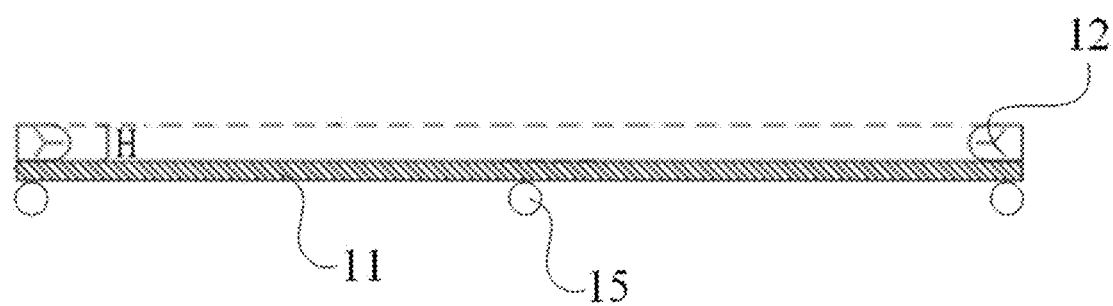
FIG. 5 is a structural schematic diagram of an interactive board according to an embodiment of the present disclosure.

Interactive board refers to a board that may interact with users, such as board products that interact with users through interactive touch technology such as multi-point infrared or optical. It should be further noted that the structure of the interactive board according to this embodiment is shown in FIG. 5. The interactive board includes an operation panel 11, an infrared touch sensor 12, and an elastic wave sensor 15. The infrared touch sensor 12 is arranged on at least one edge of the operation panel 11. Therein, the operation panel 11 is a link between users and interactive boards. Interactive boards may display different interfaces or contents through the operation panel 11, and users may send different instructions to interactive devices through gestures or touch operations in the operation panel 11. For example, the operation panel 11 may be a touch screen or the like. In this embodiment, the detection range of the infrared touch sensor may be determined based on the coverage range of the infrared emitted by the infrared touch sensor on different edges, so that the touch detection region of the infrared touch sensor is determined on the operation panel 11 of the interactive board. In addition, the elastic wave sensor 15 arranged on the interactive board is configured to detect an elastic wave generated on the operation panel 11 due to the contact of the touch object during vibration, and generates an electrical signal based on the elastic wave. The electrical signal includes waveform information of the elastic wave.

It should be further noted that when a touch object contacts with the surface of the operation panel, deformation occurs at a portion where the surface of the operation panel is contacted with, so that an elastic wave is generated, and the elastic wave propagates through the operation panel. Therein, elastic wave is a type of stress wave, and stress wave is a propagation form of stress and strain disturbances, that is, elastic wave is a form of stress and strain caused by disturbances or external forces transmitted in elastic media. There is an elastic force that interacts between particles in an elastic medium. After a particle leaves its equilibrium position due to disturbance or external force, the elastic restoring force causes the particle to vibrate, causing displacement and vibration of the surrounding particles. As a result, the vibration propagates in the elastic medium and is accompanied by energy transfer. The stress and strain changes wherever the vibration reaches.

A frequency of the elastic wave generated by the touch object contacting with the surface of the operation panel of the interactive board is determined by two contact mediums, that is, the touch object and the operation panel. During a contacting process, low-frequency fundamental waves and higher-order harmonics are generated, and the energy of low-frequency fundamental waves is generally much higher than that of higher-order harmonics. Therefore, in this embodiment, for the elastic waves generated when some commonly used touch objects contact with the surface of the operation panel of the interactive board, a resonance frequency of the elastic wave sensor is designed to be consistent with a frequency of the fundamental wave, and the frequency of the fundamental wave is positioned as the working frequency for material recognition, and thus, a signal-to-noise ratio of the sensor is improved and thus the signal-to-noise ratio of the sensor is improved.

In an embodiment, at least one elastic wave sensor is installed on the operation panel of the interactive board. Therein, the working frequency of the elastic wave sensor is basically consistent with the frequency used to distinguish different materials in the elastic wave generated by the touch object contacting with the surface of the operation panel. Under this condition, a sensitivity of detecting the elastic wave generated by the touch object at the time of writing on the operation panel can be enhanced, so that the elastic wave sensor detects the elastic wave generated when the touch object contacts with the surface of the operation panel, so that high-quality electrical signals generated, which improves the accuracy of detecting the material of the touch object.

Due to the fact that elastic waves may be transmitted in the operation panel, theoretically, an elastic wave sensor may be installed at any position on the operation panel where the elastic waves occur. The position may be any position on the operation panel or any position where there is direct or indirect contact with the operation panel, where the elastic waves generated by the touch object touching the surface of the operation panel may be detected.

In an embodiment, an elastic wave sensor may use a piezoelectric sensor, which is a sensing component made by utilizing the piezoelectric effect generated by certain dielectric materials under force. Therein, the so-called piezoelectric effect refers to a phenomenon where charges on their surface are generated due to changes in an internal charge distribution of the material when certain dielectric materials undergo deformation (including bending and stretching deformation) under the action of external forces in a certain direction.

Furthermore, piezoelectric sensors are affected by elastic waves and generate electrical signals by applying positive piezoelectric effects. Therein, the so-called positive piezoelectric effect may refer to that certain dielectrics in piezoelectric sensors generate a certain amount of charge on the electrode surface when a force is applied along a certain direction (such as the deformation caused by the touch object contacting with the surface of the operation panel) and leads to deformation, and enters a charged state; returns to the normal uncharged state after the external force is removed.

Generally speaking, a size of the operation panel of an interactive board is generally large, and document annotation services of the electronic whiteboard provided by the interactive board have a higher degree of freedom. Users may use a touch object to contact with the operation panel of the interactive board at any coordinate on the surface of the operation panel, thereby triggering touch operations (such as clicking on icons, writing handwriting, etc.). The position where the elastic wave sensor is installed on the operation panel is fixed, and the attitude of the elastic wave sensor is fixed. For the elastic wave sensor with a fixed position and attitude, the detected sensitivity and accuracy vary due to electrical signals generated at different coordinates on the operation panel of the interactive board. In general, the closer the coordinate that triggers the touch operation is to the elastic wave sensor, the higher the accuracy of the elastic wave detected by the elastic wave sensor. Conversely, the farther the coordinate that triggers the touch operation is to the elastic wave sensor, the lower the accuracy of the elastic wave detected by the elastic wave sensor.

It should be noted that if the coordinates that trigger the touch operation are too close to the elastic wave sensor, the electrical signal generated by the elastic wave sensor exceeds the maximum voltage of the operational amplifier, which causes distortion. While maintaining a certain sensitivity and accuracy, it may be considered that there is a detection range for elastic wave sensors to detect elastic waves. Therefore, the number and position of elastic wave sensors installed on the operation panel of the same interactive board may be determined based on the relationship between the detection range and the operation panel of the interactive board.

Considering that users may use touch objects to contact with the operation panel of the interactive board at any coordinate on the surface of the operation panel, while the part of the operation panel located in an invisible region (such as a region obscured by a border) is limited, the surface area of the operation panel of the interactive board represents the area where users touch the operation panel with touch objects. In general, the number of elastic wave sensors is positively correlated with the surface area of the operation panel of the interactive board. That is, the larger the surface area of the operation panel of the interactive board, the more elastic wave sensors there are. Conversely, the smaller the surface area of the operation panel of the interactive board, the less elastic wave sensors there are. Obviously, at least one elastic wave sensor should be installed on the back of the operation panel of the interactive board, that is, the number of elastic wave sensors should be at least one.

The method for recognizing the material according to an embodiment of the present disclosure includes:

Step 101, generating an infrared blocking electrical signal by the infrared touch sensor from a first moment when a touch object performs touch operation in a touch detection region.

In this embodiment, when the touch object performs touch operation within the touch detection region of the infrared touch sensor, the infrared ray emitted by the infrared touch sensor scans the touch object, and the infrared touch sensor begins to generate infrared blocking electrical signals. Therein, the first moment refers to the moment when the infrared ray of the infrared touch sensor first scans the touch object.

Step 102, generating an original touch electrical signals by the elastic wave sensor from the first moment.

At the same time, from the first moment, the elastic wave sensor generates the original touch electrical signal based on the vibration of the operation panel. Therein, the original touch electrical signal is an electrical signal generated by the elastic wave sensor based on the vibration of the operation panel after the first moment.

It should be noted that from the first moment, the elastic wave sensor beginning to generate the original touch electrical signal does not mean that the original touch electrical signal is generated at the same time as the first moment, but rather that the elastic wave sensor generates the original touch electrical signal after the first moment. Based on the detailed description mentioned above, the touch detection region with a height of H formed by the infrared touch sensor can be understood that for a complete touch operation, the touch object first enters the touch detection region with the height of H, and then contacts with the operation panel with a height of 0. Corresponding to the movement process of the touch object, the generation of the infrared blocking signal is earlier than that of the touch electrical signal, that is, the touch electrical signal is not generated simultaneously at the first moment, but it lags behind the first moment, and the absolute duration of this lag may be small, but the relative order relationship cannot be eliminated. The definition of the first moment in this solution, as well as the generation of the original touch electrical signal based on the first moment, is to confirm a true starting moment of the touch electrical signal, that is, to confirm an accurate time of contact between the touch object and the operation panel, also to confirm the infrared blocking signal generated when the touch object contacts with the operation panel, and further to accurately achieve the touch response corresponding to the actual contact position and time based on the confirmed infrared blocking signal.

Step 103, determining first material information of the touch object based on the infrared blocking electrical signal and the original touch electrical signal.

After generating the infrared blocking electrical signal and the original touch electrical signal, the first material information of the touch object is determined based on the infrared blocking electrical signal and the original touch electrical signal. Therein, the first material information includes information about the material of the touch object, for example, the first material information is a stylus or chalk. In an embodiment, in the process of determining the first material information of the touch object, probabilities corresponding to different materials may be generated based on the original touch electrical signal, for example, a probability of chalk is 65% and a probability of a stylus is 35%. Afterwards, infrared blocking electrical signals are further used to calibrate the probability and a target probability is obtained. Exemplary, the area of the touch object may be determined based on the infrared blocking electrical signal, for example, the area of the touch object is 5 mm2 or 10 mm2, and after this, further the probabilities corresponding to different materials are adjusted based on the area to obtain the target probability, and finally the first material information of the touch object is generated based on the target probability.

Step 104, determining the first material information acquired within the first duration after the first moment, and using the first material information as the material type of the touch object.

In this embodiment, if the first material information may be obtained within the first duration after the first moment, the first material information is used as the material type of the touch object. It should be further explained that a reason for setting the first duration in this embodiment is that during the use of the interactive board, there may be situations where the touch object obstructs the infrared touch sensor but does not contact with the operation panel, or elastic wave data is missed. Therefore, by setting the first duration, it may be determined whether actions of the touch object obstructing the infrared touch sensor and the touch object contacting with the interactive tablet are continuous. If a first material signal may be obtained within the first duration after the first moment, it indicates that the touch object has touched the operation panel in a very short time after obstructing the infrared touch sensor, indicating that the touch action is an effective touch action. At this time, the first material information may be used as the material type of the touch object. On the contrary, there is a possibility of missing the original touch electrical signal or accidentally obstructing the infrared sensor by the touch object. At this time, due to the inability to acquire the first material information generated by the original touch electrical signal, the material information is not considered as the material type of the touch object. Understandably, in this embodiment, the first duration may be set according to actual needs. As an example, considering the delay that users may receive during use and the time required for confirming the material type of the touch object, the first duration may be set to 20-50 milliseconds. In an embodiment, the first duration may be set to 32 milliseconds.

Step 105, determining that the first material information has not been acquired within the first duration after the first moment, and acquiring the second material information as the material type of the touch object. Therein, the second material information is generated based on infrared blocking electrical signals.

If the first material information cannot be acquired within the first duration after the first moment, in order to avoid excessive calculation delay or too long time for waiting the original contact signal caused by missed detection of elastic waves, the second material information is generated based on the infrared blocking electrical signal, and the second material information is used as the material type of the touch object. Therein, the second material information also includes the information containing the material of the touch object. In an embodiment, in the process of generating second material information based on the infrared blocking electrical signal, the area of the touch object may be determined based on the infrared blocking electrical signal, and then the second material information of the touch object may be further generated based on the area of the touch object.

For example, by storing the touch area range corresponding to different touch objects in advance, the second material information of the touch object may be generated based on the area of the touch object. For example, the touch area range of a stylus is 3-6 mm$^2$, the touch area range of chalk is 8-12 mm$^2$. When the area of the touch object is 5 mm$^2$, the second material information generated at this time is the stylus, and when the area of the touch object is 10 mm$^2$, the second material information generated at this time is the chalk.

As mentioned above, according to the embodiment of the present disclosure, when the touch object performs touch operation in the touch detection region, infrared blocking electrical signals and original touch electrical signals sent by the infrared touch sensor and elastic wave sensor are received respectively. If the first material information may be generated based on the infrared blocking electrical signal and the original touch electrical signal within the first duration after the first moment of generating the infrared blocking electrical signal, the material type of the touch object is determined based on the first material information. On the contrary, the material type of the touch object is determined based on the second material information generated based on the infrared blocking electrical signal. According to the embodiment of the present disclosure, the accuracy of recognizing the material can be improved by combining infrared blocking electrical signals with original touch electrical signals, which overcomes the low rate for recognizing the material caused by the lack of material specificity in infrared blocking electrical signals and the susceptibility of original touch electrical signals to vibration interference, thereby solving the technical problem of interactive devices being unable to accurately recognize the material of touch objects in the related art.

In the embodiment of the present disclosure, by arranging an elastic wave sensor, the original touch electrical signal generated by the elastic wave sensor when the touch object is operated on the operation panel may be collected, so that the material information of the touch object may be obtained by combining the original touch electrical signal. In the process of recognizing the material, how to locate the starting moment of the effective touch electrical signal in the original touch electrical signal is associated with the efficiency and accuracy of recognition. One solution manner (hereinafter referred to as Scheme 1) is to use the moment when the infrared touch sensor begins to generate an infrared blocking electrical signal as the starting moment of the effective touch electrical signal, use the original touch electrical signal after the starting moment as the effective touch electrical signal, and calculate the material information of the touch object based on the effective touch electrical signal. However, as mentioned above, during written on the operation panel, when the touch object enters the touch detection region of the infrared touch sensor but not contacting with the operation panel, the infrared touch sensor is caused to generate infrared blocking electrical signals, and at this time, the touch object does not actually contact with the operation panel. Therefore, there is still a time difference between the starting moment of the effective touch electrical signal determined in this way and the true starting moment of the effective touch electrical signal. The signal within this time difference is actually a noise signal, which has a negative impact on the accuracy and speed of recognizing the material of the touch object.

In order to solve the above problems, the present disclosure proposes a solution mechanism (hereinafter referred to as Scheme 2), which determines a starting moment based on changes in the signal-to-noise ratio of the original touch electrical signal. By setting a preset threshold and combining whether the changes in the signal-to-noise ratio of the original touch electrical signal are greater than the preset threshold, an effective contact electrical signal is extracted from the original touch electrical signal. Specifically, signal-to-noise ratio refers to a ratio of signal to noise in an electronic device or system. In an embodiment, signal-to-noise ratio refers to the ratio between the original electrical contact signal and noise. When the signal-to-noise ratio is greater than a certain value (preset threshold), it indicates that a value of the original electrical contact signal is relatively larger. The original electrical contact signal is not generated by noise, but by mutual contact between the touch object and the operating panel, therefore, the starting moment corresponding to the effective touch electrical signal may be determined. In some implementations, the signal-to-noise ratio may be acquired by calculating the ratio of the average energy value of the original touch electrical signals within the current time window to the historical average energy value. The historical average energy value is the average energy value of the original touch electrical signals within the previous time window. If the ratio is greater than a preset threshold, it indicates that the original touch electrical signal detected within the current window has a larger amplitude compared with the original touch electrical signal detected in the previous time window, and the change in amplitude is difficult to be generated by the environment. Therefore, the change in amplitude may be considered to be caused by the contact between the touch object and the operation panel. Therefore, the initial moment of the current window may be used as the starting moment of the original touch signal, that is, the time when the touch object and the operation panel first touch.

Figure 6:
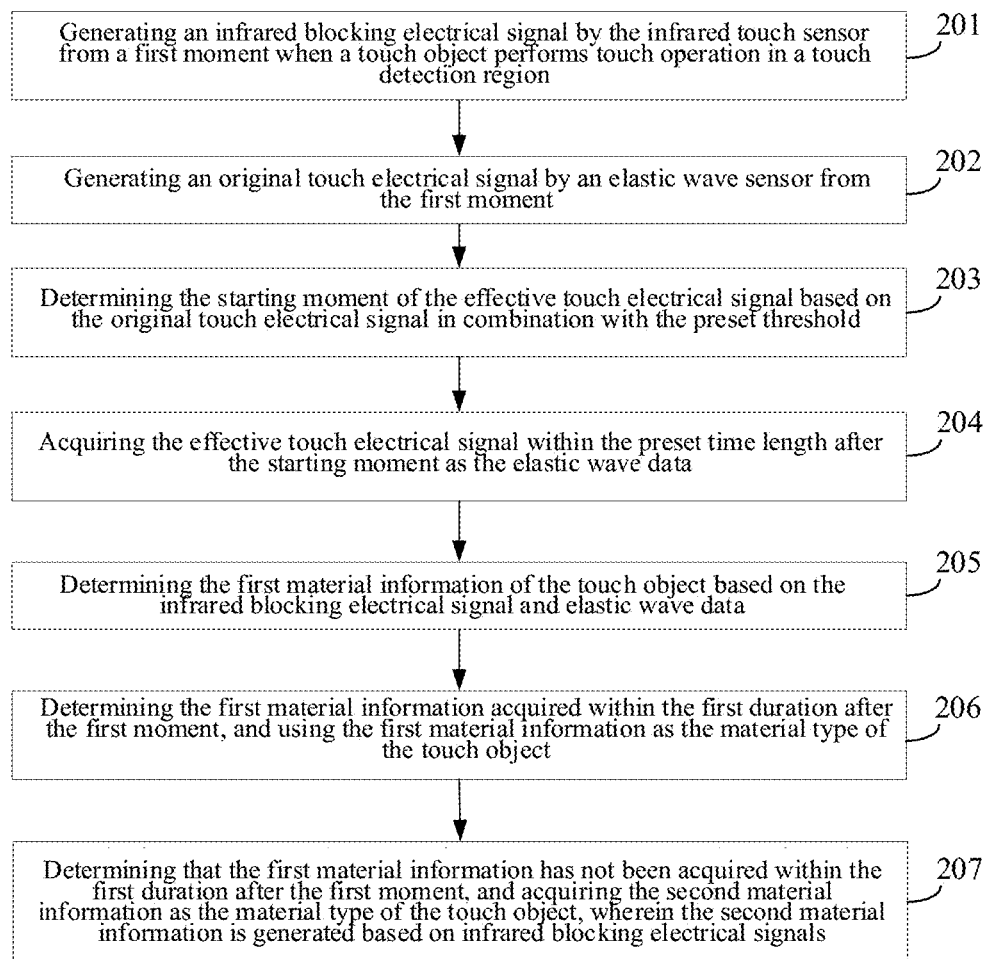
FIG. 6 is a flowchart of another method for recognizing a material according to an embodiment of the present disclosure.

In some implementations, as shown in FIG. 6, FIG. 6 is a method for recognizing a material according to Scheme 2 of an embodiment of the present disclosure, which is a concretization of the above method for recognizing the material. Referring to FIG. 6, the method for recognizing the material includes:

Step 201, generating an infrared blocking electrical signal by the infrared touch sensor from a first moment when a touch object performs touch operation in a touch detection region.

Step 202, generating an original touch electrical signal by an elastic wave sensor from the first moment.

Step 203: determining the starting moment of the effective touch electrical signal based on the original touch electrical signal in combination with the preset threshold.

In this embodiment, after obtaining the original touch electrical signal, the starting moment of the effective touch electrical signal is further determined based on the original touch electrical signal in combination with the preset threshold. The original touch electrical signals generated by the elastic wave sensors may include noise signals and interference signals, and the effective touch electrical signals contained within them need to be further confirmed. In the embodiment of the present disclosure, the original touch electrical signal collected by the elastic wave sensor is combined for calculation to obtain the starting moment of the effective touch electrical signal contained therein, so as to accurately locate the effective touch electrical signal. Therein, the starting moment is the moment when the touch object first contacts with the operation panel.

Based on the above embodiments, Step 203 of determining the starting moment of the effective touch electrical signal based on the original touch electrical signal in combination with the preset threshold includes:

Step 2031: calculating the average energy value of the original touch electrical signals within the current time window.

Time window refers to a certain fixed time length, and the end moment of the previous time window is the beginning moment of a new time window. The time length in the time window may be set according to actual needs, for example, the time length in the time window may be set to 5 milliseconds or 10 milliseconds, etc. In this embodiment, the specific time length of the time window is not limited. In this embodiment, the energy of the original touch electrical signal detected by the elastic wave sensor is determined in real time within the current time window, and the average value of the energy is calculated. Therein, the energy of the original electric contact signal refers to the sum of the kinetic energy and potential energy of the elastic medium. As the elastic wave propagates in the elastic medium, each particle vibrates near its equilibrium position, resulting in the elastic medium having vibration kinetic energy, and furthermore, since vibration causes changes in the distance between particles, the medium undergoes deformation, which gives deformation potential energy thereto. The sum of vibration kinetic energy and deformation potential energy is called the energy of elastic waves in this medium.

Step 2032, calculating a ratio of the average energy value to an historical average energy value, where the historical average energy value is an average energy value of the original touch electrical signals within a previous time window.

After calculating the average energy value within the current time window, the ratio of the corresponding average energy value within the current window to the historical average energy value corresponding to the previous time window is further calculated. Therein, the historical average energy value is the average energy value of the original touch electrical signal detected within the previous time window.

Step 2033, determining whether the ratio is greater than a preset threshold.

Step 2034, acquiring an initial moment of the current time window, and using the initial moment of the current time window as a starting moment of an effective touch electric signal if the ratio is greater than the preset threshold.

The preset threshold refers to a previously set threshold. In this embodiment, in order to distinguish between the original touch electrical signal under environmental noise and the original touch electrical signal when the touch object contacts with the interactive board, the preset threshold may be set to a value of 4 or more. If the ratio is greater than the preset threshold, it indicates that the original touch electrical signal detected within the current window has a relatively larger amplitude compared with the original touch electrical signal detected within the previous time window, and the change in this amplitude is difficult to be generated by the environment. Therefore, the change in this amplitude may be considered to be caused by the contact between the touch object and the operation panel. Therefore, the initial moment of the current window may be used as the starting moment of the effective electric touch signal, that is, the moment when the touch object and the operation panel first touch.

By the determining manner of combining the preset threshold and signal-to-noise ratio in Scheme 2, effective elastic wave signals can be effectively extracted from the original elastic wave signals, and then the material information of the touch object is recognized in combination with classification models or neural network recognition algorithms. Compared with the scheme in the related art of determining the starting moment of effective elastic wave signals based on the infrared blocking electrical signals, this scheme can more accurately recognize the material information of the touch object.

However, during the application process of Scheme 2, it is found that for interactive boards, due to their large size, usually over 65 inches, or even 86 inches or larger, their internal working circuits are more complex and may generate environmental noise during the working process. Moreover, due to the diverse usage scenarios of interactive boards, they are often used for playing audio and video information or conducting video conferences, during the sound production of its horn, it also brings environmental noise. The noise frequency of the above environmental noise in the interactive board is not stable or regular, and cannot be classified or recognized through classification models or neural network recognition algorithms. In practical applications, environmental noise signals may also meet the condition that the signal-to-noise ratio is greater than the preset threshold, resulting in inaccurate extraction of effective elastic wave signals that contain environmental noise, leading to a decrease in the accuracy of the recognition results of the material information of the touch object.

The present disclosure provides another solution mechanism (hereinafter referred to as Scheme 3): in the absence of touch objects, dynamic adjustments are made to the preset threshold based on the current noise in the environment, in order to avoid mistakenly recognizing noise as contact between the touch object and the operation panel due to excessive noise.

In some implementations, the method for recognizing the material further includes:

Step 2035, dynamically updating the preset threshold based on the first electrical signal generated by the infrared touch sensor and the second electrical signal generated by the elastic wave sensor.

In this embodiment, the preset threshold may be dynamically updated based on the first electrical signal generated by the infrared touch sensor and the second electrical signal generated by the elastic wave sensor. Therein, the first electrical signal refers to the electrical signal generated by the infrared touch sensor, the second electrical signal refers to the electrical signal generated by the elastic wave sensor, and the first and second are only used to distinguish the hardware sources of the electrical signals. In addition, for the first and second electrical signals, they may be generated after the infrared touch sensor is activated and the elastic wave sensor is activated, respectively. When the presence of a touch object is determined based on the first electrical signal, the first electrical signal is the infrared blocking electrical signal mentioned above. The infrared blocking electrical signal is actually a specific signal confirmed from the first electrical signal, and the touch object only has two types: obstruction and non-obstruction. Therefore, if the first electrical signal is not an infrared blocking electrical signal, it is assumed that there is currently no touch object. When the contact between the touch object and the interactive board is determined based on the second electrical signal, the second electrical signal is the original touch electrical signal mentioned above. Similarly, the original touch electrical signal is actually a specific signal confirmed from the second electrical signal. Therefore, if the second electrical signal is not the original touch electrical signal, it is assumed that the current touch object has not touched the interactive board. For the original touch electrical signal, the signal state of the second electrical signal when the touch object has not been touched should be used as a reference, while the preset threshold originally set deviates from the signal state of the second electrical signal when no touch has occurred during actual use. Therefore, when the interactive board determines that there is no touch object based on the first electrical signal generated by the infrared touch sensor, the preset threshold is dynamically updated based on the amplitude of the second electrical signal generated by the current elastic wave sensor, which can avoid mistakenly recognizing the noise as contact between the touch object and the operating panel when the environmental noise is too high. In some implementations, Step 2035 of dynamically updating the preset threshold based on the first electrical signal generated by the infrared touch sensor and the second electrical signal generated by the elastic wave sensor includes:

Step 20351, when it is determined that there is no touch object based on the first electrical signal generated by the infrared touch sensor, it is determined in real time whether the instantaneous amplitude of the second electrical signal generated by the elastic wave sensor is greater than the preset threshold.

Firstly, when it is determined that there is currently no touch object based on the first electrical signal generated by the infrared touch sensor, it is determined whether the instantaneous amplitude of the second electrical signal generated by the elastic wave sensor is greater than the preset threshold. Therein, when it is determined that the first electrical signal is not an infrared blocking electrical signal, it may be determined that there is no touch object in the touch detection region, and further the second electrical signal detected by the current elastic wave sensor is acquired. At this time, the second electrical signal reflects a background noise of the interactive board, namely environmental noise (mainly including circuit working noise, etc.). By determining whether the instantaneous amplitude of the second electrical signal is greater than the preset threshold, the level of noise in the current environment may be determined, so as to dynamically adjust the preset threshold. Therein, instantaneous amplitude refers to the amplitude of the energy of the current second electrical signal.

Step 20352, setting the preset threshold to the first preset threshold when the instantaneous amplitude of the second electrical signal is greater than the preset threshold.

When the instantaneous amplitude of the second electrical signal is greater than the preset threshold, it indicates that the environmental noise of the interactive board is relatively high at this time. It is necessary to increase the value of the preset threshold so as to avoid the situation where the environmental noise is too large, leading to the mistaken recognition of the environmental noise as contact between the touch object and the operation panel. Therefore, the preset threshold is set to the first preset threshold with a larger value.

Step 20353, setting the preset threshold to the second preset threshold when the instantaneous amplitude of the second electrical signal is less than the preset threshold.

Figure 7:
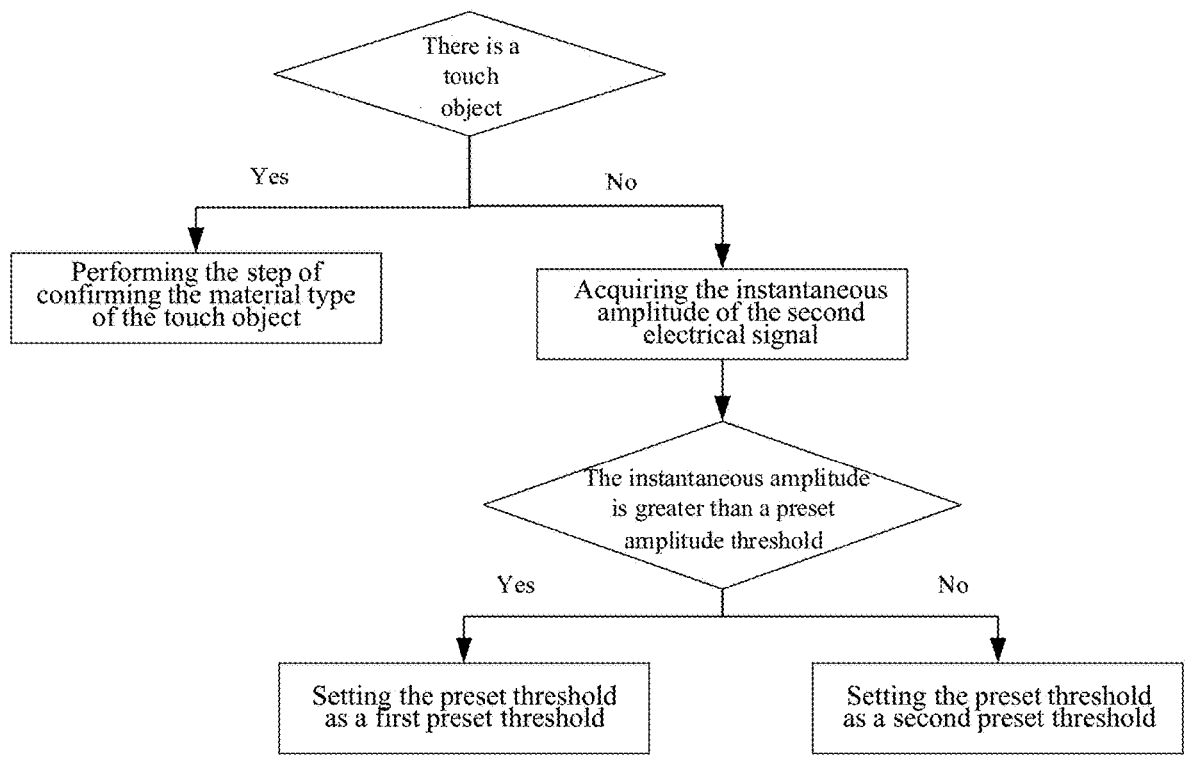
FIG. 7 is a flowchart of dynamically updating a preset threshold according to an embodiment of the present disclosure.

If the instantaneous amplitude of the second electrical signal is less than the preset threshold, it indicates that the environmental noise of the interactive board is relatively low. Therefore, the preset threshold may be set to the second preset threshold with a smaller value. When the instantaneous amplitude of the second electrical signal is equal to the preset threshold, either the first preset threshold or the second preset threshold may be selected as the preset threshold at this time. The specific process is shown in FIG. 7. In an embodiment, the first preset threshold may be set to 10 and the second preset threshold may be set to 4.

For example, during a teaching process, when a teacher uses an interactive board to play audio and video, a speaker inside the interactive board simultaneously causes vibration and generates environmental noise. At this time, when the interactive board determines that there is no touch object based on the first electrical signal generated by the infrared touch sensor, it further determines the instantaneous amplitude of the second electrical signal generated by the current elastic wave sensor. When the instantaneous amplitude of the second electrical signal is greater than the preset threshold, it indicates that the environmental noise of the interactive board is high at this time, and it is necessary to increase the value of the preset threshold, so as to avoid mistakenly recognizing the environmental noise generated by the speaker as contact between the touch object and the operation panel, the interactive board may set the preset threshold to the first preset threshold with a larger value, such as setting the first preset threshold to 10. When the instantaneous amplitude of the original electric touch signal is less than the preset threshold, it indicates that the environmental noise of the interactive board is relatively low (i.e., the speaker does not sound). The interactive board may set the preset threshold to a second preset threshold with a smaller value, such as setting the second preset threshold to 4.

The above is the process of dynamically setting the preset threshold for Scheme 3. Through Scheme 3, when it is determined that there is no effective touch object and the instantaneous amplitude of the second electrical signal is greater than the preset threshold, it indicates that the interactive board is in a working state. At this time, the environmental noise is relatively high. Therefore, the preset threshold is adjusted to the larger first preset threshold to avoid the situation where the environmental noise is mistakenly recognized as an effective touch electrical signal when the touch object contacts with the interactive board in the future. If the instantaneous amplitude of the second electrical signal is less than the preset threshold, it indicates that the environmental noise of the interactive board is relatively low. Therefore, the preset threshold may be set to the second preset threshold with a smaller value, thereby improving the detection sensitivity of effective touch electrical signals. Through Scheme 3, when there is a touch object operating on the interactive board, for some click operations, it can effectively filter out noise and accurately extract effective touch electrical signals, ensuring high detection accuracy and avoiding inaccurate extraction results due to the influence of noise.

In an embodiment of the present disclosure, the following steps are further included:

Step 204, acquiring the effective touch electrical signal within the preset time length after the starting moment as the elastic wave data.

After determining the starting moment of the effective contact electrical signal in Step 203, the effective contact electrical signal generated within a preset time length after the starting moment may be further used as elastic wave data. Therein, the preset time length may be set according to actual needs, and in this embodiment, the specific value of the preset time length is not limited.

Step 205, determining the first material information of the touch object based on the infrared blocking electrical signal and elastic wave data.

Step 206, determining the first material information acquired within the first duration after the first moment, and using the first material information as the material type of the touch object.

Step 207, determining that the first material information has not been acquired within the first duration after the first moment, and acquiring the second material information as the material type of the touch object. Therein, the second material information is generated based on infrared blocking electrical signals.

As mentioned above, when no touch object is detected, this embodiment estimates the current environmental noise based on the instantaneous amplitude of the second electrical signal generated by the elastic wave sensor, and dynamically adjusts the preset threshold based on the environmental noise. When the environmental noise is large, the preset threshold is set to the first preset threshold with a larger value. When the environmental noise is small, the preset threshold is set to the second preset threshold with a smaller value. The implementation example of the present disclosure can avoid the interference of environmental noise on the interactive board by dynamically adjusting the preset threshold, which leads to the mistaken recognition of environmental noise as the contact between the touch object and the operation panel. Therefore, when the touch object performs touch operation on the interactive board, the starting moment of the effective touch electric signal can be more accurately determined to acquire effective elastic wave data, thereby improving the accuracy of recognizing material by using effective elastic wave data in the future.

Figure 8:
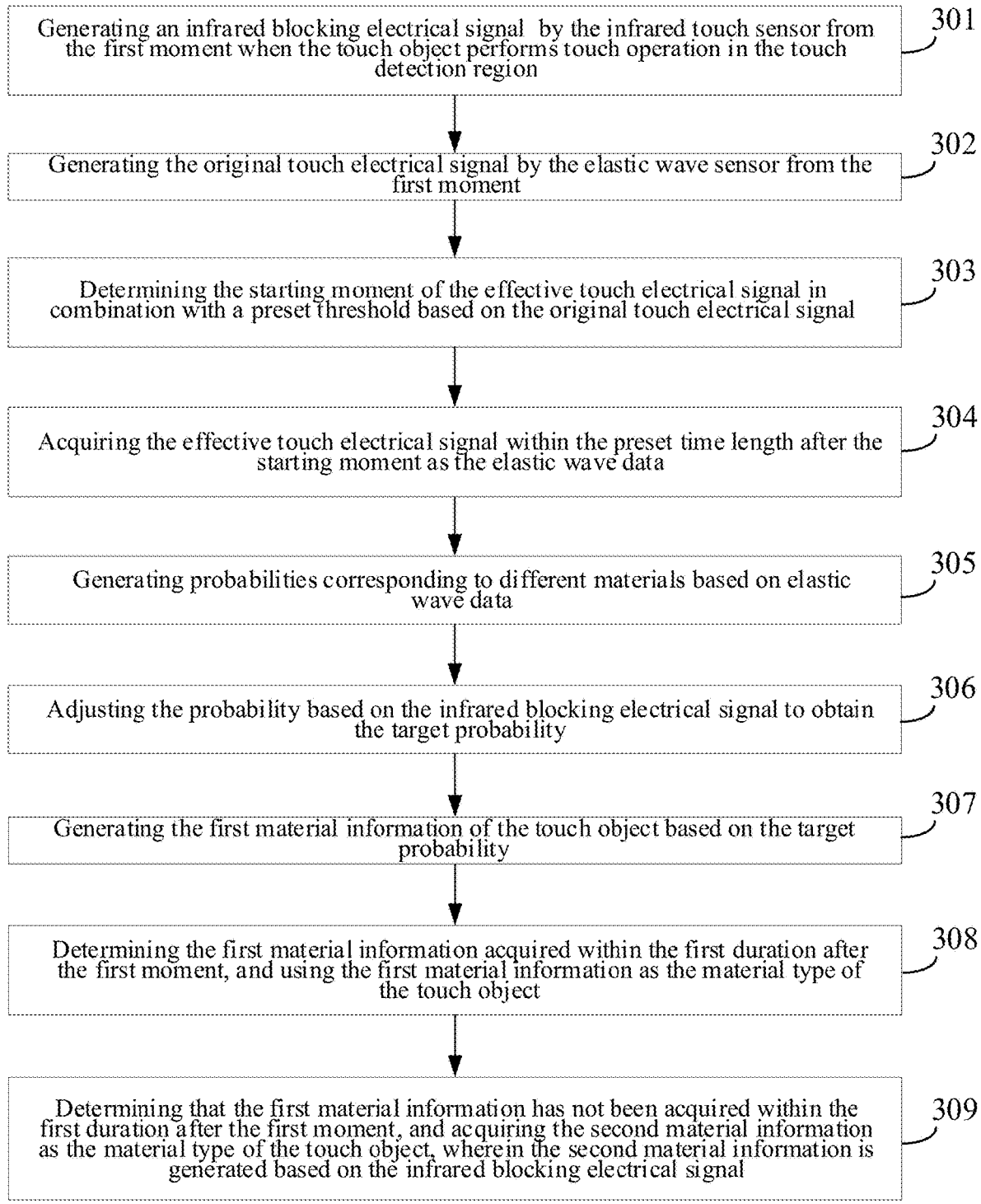
FIG. 8 is a flowchart of another method for recognizing a material according to an embodiment of the present disclosure.

As shown in FIG. 8, FIG. 8 is a method for recognizing a material according to an embodiment of the present disclosure. The method for recognizing the material is a concretization of the above method for recognizing the material. Referring to FIG. 8, the method for recognizing the material includes:

Step 301, generating an infrared blocking electrical signal from the first moment by the infrared touch sensor when the touch object performs touch operation in the touch detection region.

Step 302, generating the original touch electrical signal by the elastic wave sensor from the first moment.

Step 303, determining the starting moment of the effective touch electrical signal in combination with a preset threshold based on the original touch electrical signal.

Step 304, acquiring the effective touch electrical signal within the preset time length after the starting moment as the elastic wave data.

Step 305, generating probabilities corresponding to different materials based on elastic wave data.

In this embodiment, after obtaining effective elastic wave data, the probability corresponding to different materials is further generated based on the elastic wave data. Therein, the probability represents the likelihood of the event occurring. In this embodiment, probability represents the probability that the touch object belongs to different materials. For example, the probability of a touch belonging to a finger is 55%, or the probability of a touch belonging to a stylus is 80%, etc. In an embodiment, elastic wave data may be input into a trained neural network so as to obtain probabilities corresponding to different materials.

Based on the above embodiments, Step 305 of generating probabilities corresponding to different materials based on elastic wave data includes:

Step 3051, preprocessing the elastic wave data to obtain the target data.

Firstly, in order to eliminate the differences in elastic wave sensors and the impact of elastic wave data in different modes generated due to touch positions on subsequent calculation results, it is necessary to preprocess the elastic wave data first so as to acquire target data from the elastic wave data. For example, invalid data in elastic wave data may be removed first, such as elastic wave data with limited amplitude distortion or elastic wave data with low energy. Then, the elastic wave data may be fused to obtain the target data.

In an embodiment, elastic wave data is generated based on effective touch electrical signals corresponding to multiple elastic wave sensors.

It should be noted that in this embodiment, a preset time length is used as a data processing cycle, and the elastic wave data generated within this data processing cycle may be described or recorded in a set. Each element in the set is generated based on the effective contact electrical signal corresponding to an elastic wave sensor. For example, a set of elastic wave data is $D1=(d_1, d_2 \ldots d_n)^T$, and therein, T is a preset time length, $d_i$ is the elastic wave data obtained from the effective touch electrical signal of the i-th elastic wave sensor, and n is the number of elastic wave sensors, $i \subseteq n$.

Correspondingly, Step 3051 of preprocessing the elastic wave data to obtain the target data includes:

Step 30511, performing time-frequency transformation on the elastic wave data of multiple elastic wave sensors to obtain frequency domain data corresponding to the elastic wave data.

Firstly, time-frequency transformation is performed on the elastic wave data of multiple elastic wave sensors to obtain the frequency domain data corresponding to the elastic wave data.

Therein, time-frequency transformation refers to the conversion of time-domain data into frequency domain data. For example, Fourier transform may be performed on each elastic wave data in the set D1 of elastic wave data to obtain the corresponding frequency domain data D2. It is understandable that frequency domain data may also be described or recorded in a set format, that is, the frequency domain data set includes frequency domain data corresponding to each elastic wave data in the set D1 of elastic wave data. In an embodiment, before performing time-frequency transformation, the amplitude of each data in the set D1 of elastic wave data may also be compared with the preset effective signal amplitude to determine the data with limiting distortion (i.e. data with values greater than the amplitude of the effective signal), and the data with limiting distortion may be removed.

Step 30512, performing multi-channel signal fusion on frequency domain data to obtain fused data.

Figure 9:
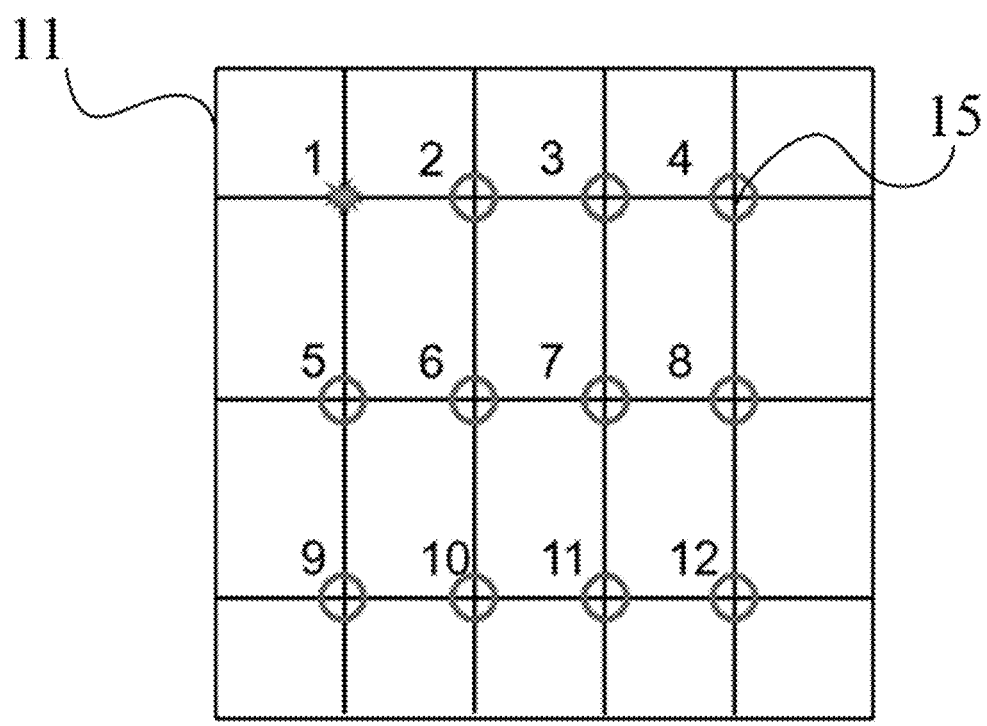
FIG. 9 is a schematic diagram of an elastic wave sensor installed on an operation panel according to an embodiment of the present disclosure.
Figure 10:
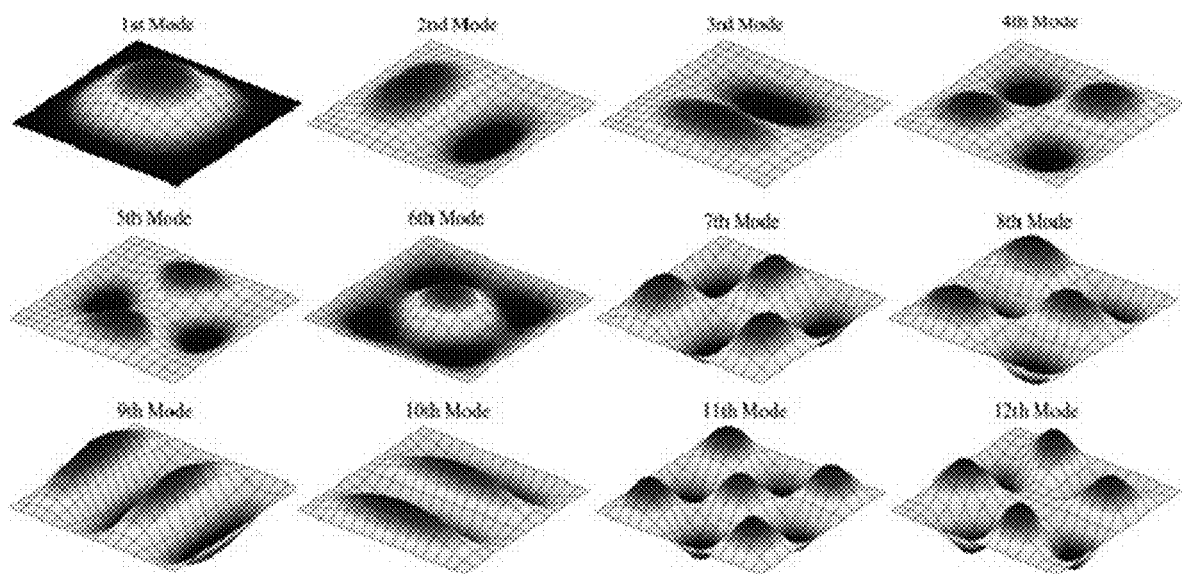
FIG. 10 is a schematic diagram of elastic wave data in different modes detected by the elastic wave sensor at different positions according to an embodiment of the present disclosure.

After obtaining the frequency domain data, multi-channel fusion is performed on the frequency domain data to obtain the fused data. Therein, multi-channel fusion refers to the fusion of each data in a set of frequency domain data to obtain fused data. In this embodiment, the purpose of multi-channel signal fusion is to eliminate the differences between various elastic wave sensors and the impact of elastic wave data in different modes generated by touch positions on subsequent calculation results. Therein, the difference in elastic wave sensors refers to the slight differences in the elastic wave sensors produced on the same production line due to the influence of production process or production environment during production. Even when two elastic wave sensors produced on the same production line are placed in the same position, there will be slight differences in the elastic waves collected by the two elastic wave sensors. The elastic waves in different modes generated at the touch position refers to that the elastic waves collected by the elastic wave sensor have different modes when the elastic wave propagates to different positions. For example, the area of the operation panel 11 of the interactive board is shown in FIG. 9. Elastic wave sensors 15 are respectively installed below Positions 1 to 12 of the operation panel 11. When the touch point of the touch object and the operation panel 11 is at Position 1, elastic wave sensors 15 at different positions detect elastic waves in different modes, as shown in FIG. 10, FIG. 10 shows schematic diagrams of elastic waves in different modes detected by the elastic wave sensor 15 at Positions 1 to 12. Due to the fact that each elastic wave sensor may only reflect partial information about the vibration characteristics of the touch object, the accuracy of recognizing the material for each elastic wave sensor is limited, resulting in poor accuracy of recognizing the material. Therefore, in this embodiment, by fusing the frequency domain data corresponding to the elastic waves, the expression of material information may be enhanced, which avoids the impact of differences in the signal of each elastic wave sensor due to different contact positions on subsequent calculation processes.

In this embodiment, multi-channel signal fusion may be performed through manners such as weighted averaging or neural networks so as to obtain target data. In some implementations, different multi-channel signal fusion methods will be explained hereinafter.

In an embodiment, the step of performing multi-channel signal fusion on frequency domain data to obtain fused data includes:

performing weighted averaging on frequency domain data to obtain fused data.

In an embodiment, frequency domain data may be weighted average to obtain fused data. For example, assuming that the frequency domain data is $D2=(d_{21}, d_{22} \ldots d_{2n})^T$, the formula for weighted average of the frequency domain data is as follows.

$$D3 = \sum_{i=1}^{i=n} w_i * d_{2i} \quad (1)$$

Therein, D3 is fused data, $w_i(i=1, 2 \ldots n)$ is empirical weight parameter, and $d_{2i}$ is the i-th data in the frequency domain data D2.

In an embodiment, the step of performing multi-channel signal fusion on frequency domain data to obtain fused data includes:

inputting frequency domain data into the preset first neural network to obtain fused data.

In another embodiment, frequency domain data may be input into a trained first neural network to obtain fused data, which is as follows.

$$D3 = f\left(\sum_{i=1}^{i=n} c_i * d_{2i} + h_i\right) \quad (2)$$

Therein, $c_i$, $h_i(i=1, 2 \ldots n)$ is a training weight parameter of the first neural network, and f is an activation function of the first neural network. The frequency domain data D2 is input into the trained first neural network for calculation, and then the fused signal may be obtained. Step 30513, filtering the fused data to obtain the target data.

Finally, the fused data are filtered to obtain the desired target data.

In an embodiment, Step 3051 of preprocessing the elastic wave data to obtain the target data includes:

Step 30514, calculating a system function of elastic waves propagating to respective elastic wave sensors.

In this embodiment, firstly the system function of elastic waves propagating to respective elastic wave sensors is calculated. Therein, the system function is a rational function of a complex variable S with real coefficients, that is, a real rational function. The process of calculating the system function of elastic waves may refer to the process of calculating the system function in the related art, which will not be repeated in this embodiment.

Step 30515, dividing the elastic wave data corresponding to each elastic wave sensor by the corresponding system function to obtain the first data corresponding to each elastic wave sensor.

After calculating the system functions corresponding to each elastic wave sensor, the elastic wave data corresponding to each elastic wave sensor is divided by the corresponding system function to obtain first data corresponding to each elastic wave sensor. In some implementations, in this embodiment, the elastic wave data corresponding to each elastic wave sensor in the set of elastic wave data is divided by the system function corresponding to each elastic wave sensor, and then the first data corresponding to each elastic wave sensor may be obtained.

Step 30516, calculating an average of all the first data to obtain the target data.

After obtaining the first data corresponding to each elastic wave sensor, the average of all the first data is calculated, and then the target data is obtained. In an embodiment, the calculation formula for target data D4 is as follows.

$$D4 = \frac{\sum_{i=1}^{n} \frac{d_i}{H_i}}{n} \quad (3)$$

Therein, $H_i$ represents the system function corresponding to the i-th elastic wave sensor.

The above is the process of preprocessing the elastic wave data to obtain the target data in Step 3051.

Step 3052, inputting the target data into the preset neural network to obtain probabilities corresponding to different materials.

Figure 11:
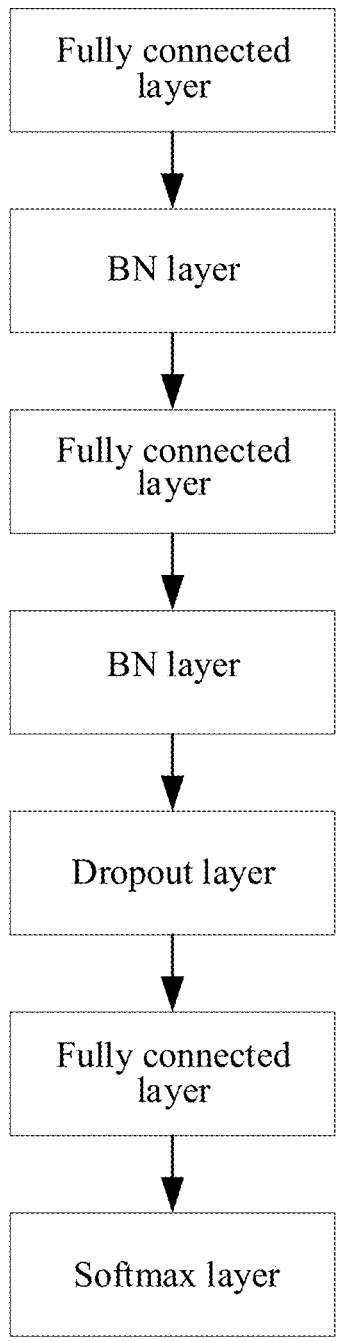
FIG. 11 is a structural schematic diagram of a multilayer full connected network according to an embodiment of the present disclosure.
Figure 11:
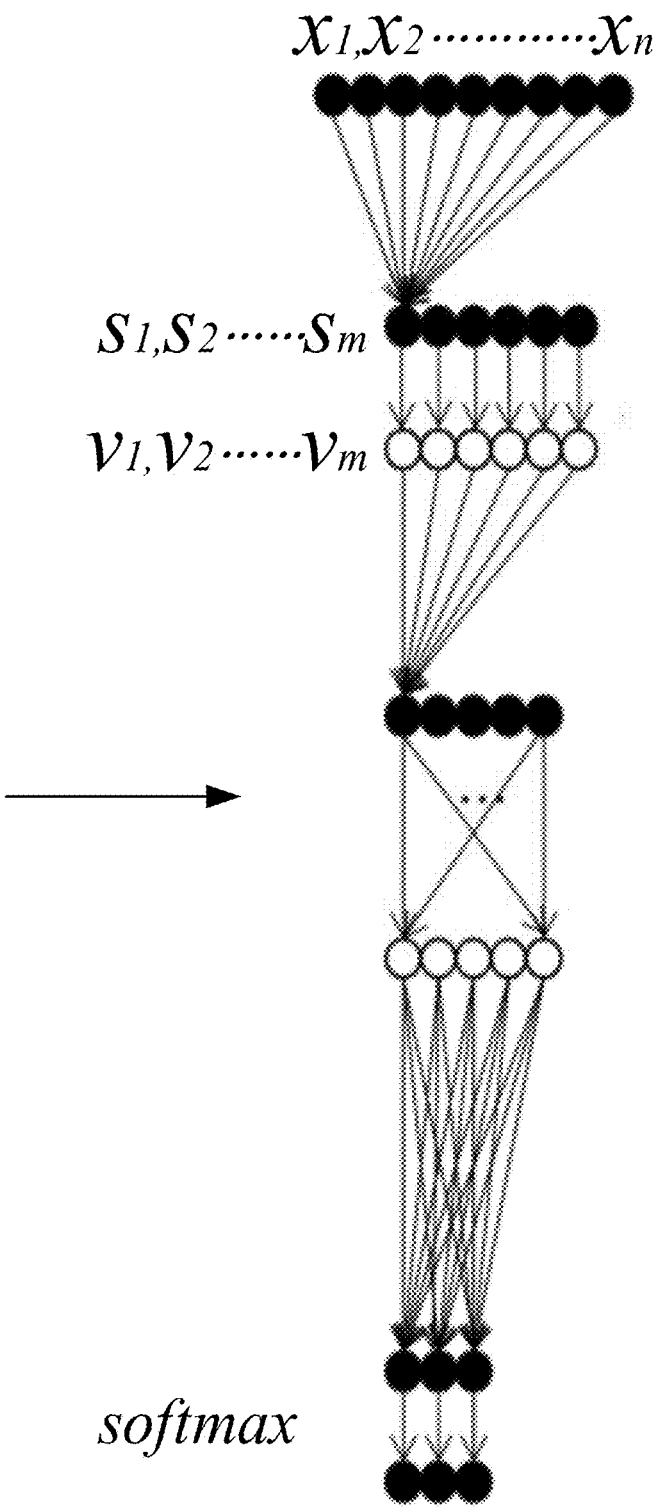

During obtaining the set of target data, the set of target data is input into the trained neural network, and then probabilities corresponding to different materials may be obtained. In an embodiment, the neural network is a multi-layer fully connected network, including a first fully connected layer, a second fully connected layer, a third fully connected layer, a first BN layer, a second BN layer, a Dropout layer, and a Softmax layer. The first fully connected layer, first BN layer, second fully connected layer, second BN layer, Dropout layer, third fully connected layer, and Softmax layer are sequentially connected, as shown in FIG. 11.

In some implementations, for the input of one-dimensional data $X=(x_1, x_2 \ldots x_n)^T$ of a multi-layer fully connected network, a feature vector $S=(s_1, s_2 \ldots s_m)^T$ is obtained through feature mapping of the fully connected layer. Therein, n is the number of one-dimensional data and m is the number of nodes output by the fully connected layer (feature vector dimension). The calculation is shown in Formula 4.

$$S_j = g\left(\sum_{i=1}^{k} w_{ij} * x_{ij} + b_{ij}\right)(j = 1, 2 \ldots m) \quad (4)$$

Therein, g is an activation function, $w_{ij}$ and $b_{ij}$ are weight parameters of the corresponding nodes of the full connection layer, and k is the number of input nodes.

The feature vector $S=(s_1, s_2 \ldots s_m)^T$ is normalized through the BN layer to obtain normalized features $V=(v_1, v_2 \ldots v_m)^T$, as shown in Formula 5.

$$v_j = \gamma_b\left(\frac{s_j - m_b}{\delta_b}\right) + \beta_b (j = 1, 2 \ldots m) \quad (5)$$

Therein, $\beta_b$, $\gamma_b$, $m_b$, $\delta_6$ are the training parameters.

After stacking through fully connected layers and BN layers, the one-dimensional data input into the multi-layer fully connected network is linearly mapped into feature data, and finally the feature data is input into the Dropout layer and Softmax layer to obtain probability. Therein, the Dropout layer is used to shield the connection mode of the full connection layer according to the Bernoulli distribution probability during the training of the multi-layer full connection network, as shown in Formula 6.

$$\begin{cases} s_j = g\left(\sum_{i=1}^{k} w_{ij} * x_{ij} * r_{ij} + b_{ij}\right)(j = 1, 2 \ldots m) \\ r_{ij} \sim \text{Bernoulli}(p) \end{cases} \quad (6)$$

Therein, $r_{ij}$ is 0 or 1 randomly generated according to Bernoulli distribution with probability p. In practical use, the Dropout probability value p is 0, and $r_{ij}$ is always equal to 1.

Finally, the probability $Y=(y_1, y_2 \ldots y_t)^T$ corresponding to each material is obtained through the softmax layer, as shown in Formula 7.

$$y_i = \text{softmax}(s_i) = \frac{e^{s_i}}{\sum_{i=1}^{t} e^{s_i}} (i = 1, 2 \ldots t) \quad (7)$$

Therein, t is the number of materials.

It should be further explained that in this embodiment, the training parameters and weight parameters of the multi-layer fully connected network are obtained by pre-training the multi-layer fully connected network. Exemplary, In an embodiment, training parameters and weight parameters of the multi-layer fully connected network are obtained by training the multi-layer fully connected network with a cross-entropy loss function and Adam optimization algorithm. The training process is:

acquiring a sufficient number of sets of historical target data as training data, and extracting a part of the sets of historical target data as a validation set. Therein, the set of historical target data is the set of target data obtained historically. Afterwards, the corresponding material information is labelled for each historical target data in the training set and one-hot labels are generated.

$$\begin{cases} L_q = (l_1, l_2 \ldots, l_t)^T \\ l_{i=q} = 1 & (i = 1, 2 \ldots t) \\ l_{i \neq q} = 0 & (i = 1, 2 \ldots t) \end{cases}$$

Therein, L is the label of the q-th material.

Then, cross-entropy loss function and Adam optimization algorithm are used to train the multi-layer fully connected network.

Cross-entropy loss is shown in Formula 8.

$$\text{loss} = -\sum_{i=1}^{t} l_i \log y_i \quad (8)$$

The training process of multi-layer fully connected network using cross-entropy loss function and Adam optimization algorithm may refer to the relevant neural network training process. It should be noted that in this embodiment, the training rounds of the multi-layer fully connected network are 100, and the data volume in the training data is 512 each time. After the training is completed, the validation set is input into the trained multi-layer fully connected network, and it is determined whether the trained multi-layer fully connected network meets the requirements based on the probability of the output of the multi-layer fully connected network. If the recognition rate of the multi-layer fully connected network on the verification set reaches 0.9975 or above, the multi-layer fully connected network is determined to be a trained multi-layer fully connected network, and the training parameters and weight parameters may be acquired from the multi-layer fully connected network.

The above training process for training parameters and weight parameters may be summarized as: collecting a first preset volume of target data as training data, and collecting a second preset volume of target data as validation data; receiving material labels corresponding to respective training data and validation data; and training the multi-layer fully connected network based on the rounds by using cross-entropy loss function and Adam optimization algorithm. Therein, each round is trained with the training data corresponding to the preset data volume, and the corresponding initial network model obtained by training each round. The initial network model is verified through validation data, and when the validation recognition rate of the initial network model reaches a preset indicator, it is confirmed that the training parameters and weight parameters of the initial network model are the training parameters and weight parameters of the multi-layer fully connected network, and the training is finished. On the basis of the training process described broadly herein, the training rounds, the preset data volume corresponding to each round, the cross-entropy loss function and other implementation details used as example descriptions in the specific training process described above may be adjusted.

The above steps are the specific process of obtaining probabilities corresponding to different materials based on elastic wave data. Compared with conventional artificial feature methods, the method of outputting probabilities corresponding to different materials by using a multi-layer fully connected network has high recognition accuracy and good robustness.

Step 306, adjusting the probability based on the infrared blocking electrical signal to obtain the target probability.

After obtaining the probability, in order to avoid decrease in the accuracy of recognizing the material due to vibration interference of elastic wave data, in this embodiment, the probability is further adjusted based on the infrared blocking electrical signal so as to obtain the target probability. In an embodiment, the step of adjusting the probability based on the infrared blocking electrical signal to obtain the target probability includes:

Step 3061, determining an area of the touch object based on the infrared blocking electrical signal.

Firstly, the area of the touch object is determined based on the infrared blocking electrical signal. The process of determining the area of the touch object based on the infrared blocking electrical signal may refer to existing literature, which will not be described in this embodiment.

Step 3062, determining a weight corresponding to the area and different materials based on the area of the touch object.

After determining the area of the touchable object, the area and the weight corresponding to different materials are further determined. Therein, weight refers to the importance of a certain factor or indicator relative to a certain matter. In this embodiment, the area has different numerical ranges, for example, a numerical range of 8-12 mm$^2$ characterizes a touch object, a numerical range of 16-22 mm$^2$ characterizes another touch object, a numerical range of 25-35 mm$^2$ characterizes still another touch object, therefore, different areas falling into different area ranges have corresponding weights between different materials. For example, when the area of the touch object is 10 mm$^2$, in this case, the weight corresponding to the chalk is 0.2, the weight corresponding to the stylus is 0.6, and the weight corresponding to the fingers is 0.2. When the area of the touch object is 20 mm$^2$, in this case, the weight corresponding to the chalk is 0.6, the weight corresponding to the stylus is 0.2, and the weight corresponding to the fingers is 0.2. When the area of the touch object is 30 mm$^2$, in this case, the weight corresponding to the chalk is 0.2, the weight of the stylus is 0.2, and the weight corresponding to the fingers is 0.6. Understandably, the weights of different materials corresponding to different areas are preset.

Step 3063, adjusting the probabilities (above-mentioned probabilities corresponding to different materials) based on the weight to obtain the target probability.

After obtaining the weight between the area of the touch object and different materials, the probability corresponding to different materials output by the multi-layer fully connected network is adjusted based on the weight to obtain the target probability. In this embodiment, the probability corresponding to each material is multiplied by the corresponding weight, and then the target probability for different materials may be obtained. For example, the probabilities of different materials output by a multi-layer fully connected network are shown in Table 1.

TABLE 1

| Probability | Chalk | Stylus | Finger |
|---|---|---|---|
| Material | 0.3 | 0.2 | 0.5 |

The weights of different materials obtained based on the area of the touch object are shown in Table 2.

TABLE 2

| Weight | Chalk | Stylus | Finger |
|---|---|---|---|
| Material | 0.2 | 0.2 | 0.6 |

At this point, the probability corresponding to each material is multiplied by its corresponding weight. The target probability of the chalk is 0.3×0.2=0.06, the target execution degree of the stylus is 0.2×0.2=0.04, and the target probability of the finger is 0.5×0.6=0.3

Step 307, generating the first material information of the touch object based on the target probability.

Finally, the first material information is generated based on the target probability. In some implementations, in each material, the material with the highest target probability value is selected and the first material information is generated based on that material. For example, when the target probability of the fingers is the highest, the first material information is generated based on the fingers.

Step 308, determining the first material information acquired within the first duration after the first moment, and using the first material information as the material type of the touch object.

Step 309, determining that the first material information has not been acquired within the first duration after the first moment, and acquiring the second material information as the material type of the touch object, and therein, the second material information is generated based on the infrared blocking electrical signal.

As mentioned above, according to the embodiment of the present disclosure, when the elastic wave data is preprocessed, the elastic wave data is fused by using a multi-channel fusion strategy to obtain the fused data. This can avoid the failure of the elastic wave data due to abnormalities and misidentification when the elastic wave data detected by a single elastic wave sensor is used to determine the material of the touch object, and can enhance the stability of the set of target data, thereby avoiding the impact of differences in elastic wave data detected by each elastic wave sensor due to different touch positions on subsequent calculations. In addition, according to the embodiment of the present disclosure, the method of using a multi-layer fully connected network to output the probabilities corresponding to different materials has high recognition accuracy and good robustness compared with conventional artificial feature methods. Secondly, according to the embodiment of the present disclosure, the probability is further adjusted by combining infrared blocking electrical signals, which can improve the recognition accuracy of multi-layer fully connected networks and improve the accuracy of material recognition.

In an embodiment, the method further includes:

Step 401, if the first material information is not acquired within the first duration after the first moment, acquiring the infrared blocking electrical signal at the previous moment, and determining whether the current touch operation is associated with the touch operation at the previous moment based on the current infrared blocking electrical signal, and if associated, acquiring the material type corresponding to the previous moment as the material type of the touch event.

In this embodiment, when it is determined that the first material information has not been acquired within the first duration after the first moment, the infrared blocking electrical signal at the previous moment is further acquired, and it is determined whether the current touch operation is associated with the touch operation at the previous moment based on the current infrared blocking electrical signal. Therein, association refers to that the current touch operation of the touch object on the operation panel and the touch operation at the previous moment are generated by a series of consecutive actions, for example, the user uses a finger to continuously slide on the touch detection region of the operation panel. Due to the short pause time of the touch object during a series of consecutive actions, it may be ruled out that the replacement of the touch object during the touch process, that is, the material of the touch object remains unchanged. If the current touch operation is associated with the touch operation at the previous moment, it may be ruled out that the material of the touch object has changed, and the material type of the previous touch event may be directly used as the material type of the current touch event.

For example, if the first touch operation, second touch operation, and third touch operation are multiple continuous touch operations generated by a series of consecutive touch actions, after confirming the first material type of the touch object in the first touch operation, subsequently, the first material type of the touch object may be directly acquired as the second material type of the touch object in the second touch operation. Similarly, the second material type may be directly acquired as the third material type of the touch object in the third touch operation. It can be understood that when a series of consecutive touch actions further generate a fourth touch operation . . . the Nth touch operation, the rest may be done in the same manner, which will not be further described in this embodiment.

In an embodiment, when determining whether the current touch operation is associated with the touch operation at the previous moment, it may be confirmed whether the current touch operation is associated with the touch operation at the previous moment based on time interval between the current touch operation and the touch operation at the previous moment, as well as the distance between the touch points.

In an embodiment, Step 401 of acquiring the infrared blocking electrical signal at the previous moment, and determining whether the current touch operation is associated with the touch operation at the previous moment based on the current infrared blocking electrical signal includes:

Step 4011, determining the touch point based on the current infrared blocking electrical signal, and determining the historical touch point based on the infrared blocking electrical signal at the previous moment.

Touch point refers to the point at which a touch object contacts with an interactive board. In this embodiment, the current touch point of the touch object is first confirmed based on the current infrared blocking electrical signal, and the historical touch point of the touch object at the previous moment is determined based on the infrared blocking electrical signal at the previous moment.

Step 4012, calculating the distance between the touch point and the historical touch point, and determining the time interval between the first and previous moments.

After determining the historical touch points at the previous moment, the distance between the touch point and the historical touch point is further calculated, as well as the time interval between the first moment and the previous moment is determined.

Step 4013, determining that the current touch operation is associated with the touch operation at the previous moment when the distance is less than the preset distance and the time interval is less than the preset time interval.

When the distance between the touch point and the historical touch point is less than the preset distance, and the time interval between the first moment and the previous moment is less than the preset time interval, it indicates that the current touch operation and the touch operation at the previous moment are generated by a series of consecutive touch actions of the touch object, and it is determined that the current touch operation is associated with the touch operation at the previous moment.

As mentioned above, according to the embodiment of the present disclosure, whether the current touch operation is associated with the touch operation at the previous moment is determined, and if associated, the material type corresponding to the previous moment is acquired as the material type of the touch event. This may reduce the computation amount in the process of recognizing the material of the touch object, further reduce the delay of the process of recognizing the material, thereby avoiding stuttering caused by calculation delay, and improving the user experience.

Figure 12:
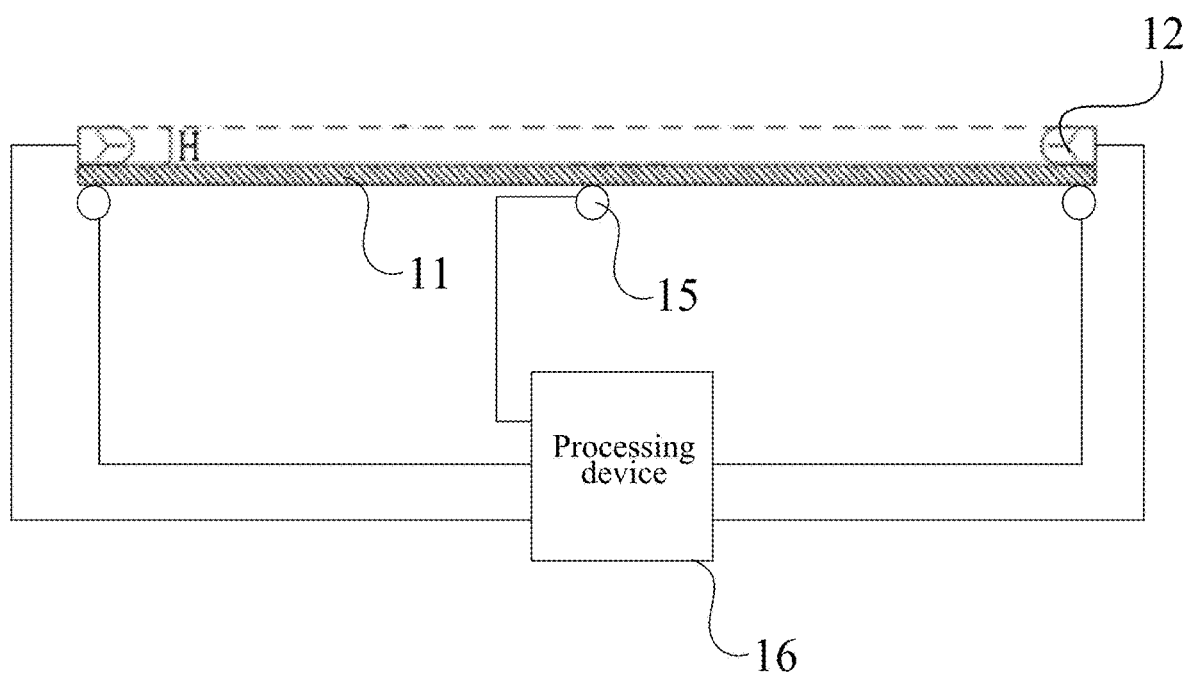
FIG. 12 is a structural schematic diagram of another interactive board according to an embodiment of the present disclosure.

As shown in FIG. 12, FIG. 12 is a structural schematic diagram of an interactive board according to the present disclosure. The interactive board includes an operation panel 11, an infrared touch sensor 12, an elastic wave sensor 15, and at least one processing device 16. The infrared touch sensor 12 is arranged on at least one edge of the operation panel 11 to form a touch detection region of the interactive board, the elastic wave sensor 15 is configured to detect the vibration of the operation panel 11 and generate an electrical signal, and at least one processing device 16 is configured to:

generate an infrared blocking electrical signal by the infrared touch sensor from a first moment when a touch object performs touch operation in a touch detection region;

generate an original touch electrical signal by the elastic wave sensor from the first moment;

calculate an average energy value of the original touch electrical signals within a current time window;

calculate a ratio of the average energy value to an historical average energy value, and therein, the historical average energy value is an average energy value of the original touch electrical signals within a previous time window;

determine whether the ratio is greater than a preset threshold;

acquire an initial moment of the current time window, and use the initial moment of the current time window as a starting moment of an effective touch electric signal if the ratio is greater than the preset threshold;

acquire the effective touch electrical signal within a preset time length after the starting moment as elastic wave data; and determine first material information of the touch object based on the infrared blocking electrical signal and elastic wave data.

In this embodiment, multiple elastic wave sensors are installed on the back of the operation panel, and the elastic wave sensors may be directly or indirectly installed on the operation panel. For example, when being directly installed, the elastic wave sensor may be installed on the back of the operation panel through adhesive bonding. When being indirectly installed, components may be installed indirectly on the back of the control panel. For example, after installing the elastic wave sensor on the FPC board, the FPC board can be installed on the back of the control panel to transmit electrical signals through the FPC board. Therein, FPC (Flexible Printed Circuit) board, that is, flexible circuit board, is generally made of polyimide or polyester film as the substrate, which has the advantages of light weight, thin thickness, strong flexibility and high wiring density.

According to the embodiment of the present disclosure, when the touch object is subjected to touch operation in the touch detection region, infrared blocking electrical signals and original touch electrical signals sent by the infrared touch sensor and elastic wave sensor are received respectively. If the first material information can be generated based on the infrared blocking electrical signal and the original touch electrical signal within the first duration after the first moment of generating the infrared blocking electrical signal, the material type of the touch object is determined based on the first material information. On the contrary, the material type of the touch object is determined based on the second material information generated by the infrared blocking electrical signal. The embodiment of the present disclosure can improve the accuracy of recognizing the material by combining infrared blocking electrical signals with original touch electrical signals, overcome the low rate for recognizing the material caused by the lack of material specificity in infrared blocking electrical signals and the susceptibility of original touch electrical signals to vibration interference, and solve the technical problem of interactive devices being unable to accurately recognize the material of touch objects in the related art. Secondly, according to the embodiment of the present disclosure, by setting the first duration, it is possible to directly use the second material information generated based on the infrared blocking electrical signal to confirm the material type of the touch object when the first material information cannot be generated in a timely manner based on the infrared blocking electrical signal and the original touch electrical signal, thereby avoiding the technical problem of poor user experience caused by long calculation delay.

On the basis of the above embodiments, the method further includes:
  dynamically updating the preset threshold based on the first electrical signal generated by the infrared touch sensor and the second electrical signal generated by the elastic wave sensor.

On the basis of the above embodiments, the step of dynamically updating the preset threshold based on the first electrical signal generated by the infrared touch sensor and the second electrical signal generated by the elastic wave sensor includes:
  determining in real time whether instantaneous amplitude of the second electrical signal generated by the elastic wave sensor is greater than the preset threshold when it is determined that there is no touch object based on the first electrical signal generated by the infrared touch sensor;
  setting the preset threshold to the first preset threshold when the instantaneous amplitude of the second electrical signal is greater than the preset threshold; and
  setting the preset threshold to the second preset threshold when the instantaneous amplitude of the second electrical signal is less than the preset threshold.

Based on the above embodiments, the step of determining first material information of the touch object based on the infrared blocking electrical signal and elastic wave data includes:
  generating probabilities corresponding to different materials based on elastic wave data;
  adjusting the probabilities based on the infrared blocking electrical signal to obtain a target probability; and
  generating the first material information of the touch object based on the target probability.

Based on the above embodiments, the step of adjusting the probability based on the infrared blocking electrical signal to obtain the target probability includes:
  calculating an area of the touch object based on the infrared blocking electrical signal;
  determining weights corresponding to different materials and the area based on the area of the touch object; and
  adjusting the probability based on the weight to obtain the target probability.

Based on the above embodiments, the step of generating probabilities corresponding to different materials based on elastic wave data includes:
  preprocessing elastic wave data to obtain target data; and
  inputting the target data into a preset neural network to obtain probabilities corresponding to different materials.

On the basis of the above embodiments, the step of generating the elastic wave data is generated based on the effective contact electrical signals corresponding to multiple elastic wave sensors, and the preprocessing the elastic wave data to obtain the target data includes:
  performing time-frequency transformation on the elastic wave data of multiple elastic wave sensors to obtain the frequency domain data corresponding to the elastic wave data;
  performing multi-channel signal fusion on frequency domain data to obtain fused data; and
  filtering the fused data to obtain the target data.

Based on the above embodiments, the step of performing multi-channel signal fusion on frequency domain data to obtain fused data includes:
  performing weighted averaging on frequency domain data to obtain fused data.

Based on the above embodiments, the step of performing multi-channel signal fusion on frequency domain data to obtain fused data includes:
  inputting the frequency domain data into the preset first neural network to obtain fused data.

On the basis of the above embodiments, the step of preprocessing elastic wave data to obtain target data includes:
  calculating a system function of elastic waves propagating to respective elastic wave sensors;
  dividing the elastic wave data corresponding to each elastic wave sensor by the corresponding system function to obtain the first data corresponding to each elastic wave sensor; and
  calculating the average of the first data to obtain the target data.

On the basis of the above embodiments, the neural network is a multi-layer fully connected network, including a first fully connected layer, a second fully connected layer, a third fully connected layer, a first BN layer, a second BN layer, a Dropout layer, and a Softmax layer. The first fully connected layer, the first BN layer, the second fully connected layer, the second BN layer, the Dropout layer, the third fully connected layer, and the Softmax layer are connected in sequence.

On the basis of the above embodiments, training parameters and weight parameters of the multi-layer fully connected network are obtained by training the multi-layer fully connected network with the cross-entropy loss function and Adam optimization algorithm.

Based on the above embodiments, the training parameters and weight parameters are obtained by a following training manner:
  collecting the first preset volume of target data as training data, and collecting the second preset volume of target data as validation data;
  receiving material labels corresponding to respective training data and validation data;
  training the multi-layer fully connected network by using cross-entropy loss function and Adam optimization algorithm based on the rounds. Therein, the training data corresponding to the preset data volume is trained in each round, and the corresponding initial network model is obtained by each round of training; and
  verifying the initial network model through validation data, confirming that the training parameters and weight parameters of the initial network model are the training parameters and weight parameters of the multi-layer fully connected network when the validation recognition rate of the initial network model reaches a preset indicator, and finishing the training.

On the basis of the above embodiments, the method further includes:
  acquiring the infrared blocking electrical signal at the previous moment if the first material information has not been acquired within the first duration after the first moment, and determining whether the current touch operation is associated with the touch operation at the previous moment based on the current infrared blocking electrical signal, and acquiring the corresponding material type at the previous moment as the material type of the touch event if associated.

Based on the above embodiments, the step of acquiring the infrared blocking electrical signal at the previous moment, and determining whether the current touch operation is associated with the touch operation at the previous moment based on the current infrared blocking electrical signal includes:
  determining the touch point based on the current infrared blocking electrical signal, and determining the historical touch point based on the infrared blocking electrical signal at the previous moment;
  calculating the distance between the touch point and the historical touch point, and determining the time interval between the first moment and the previous moment; and
  determining that the current touch operation is associated with the touch operation at the previous moment when the distance is less than the preset distance and the time interval is less than the preset time interval.

The interactive board embodiment of the present disclosure is used to perform relevant operations in the method for recognizing the material according to any embodiment of the present disclosure, and has corresponding functions and beneficial effects.

In addition, according to the embodiment of the present disclosure, a storage medium including computer executable instructions is further provided, and the computer executable instructions are used to perform relevant operation in the method for recognizing the material according to any embodiment of the present disclosure when being executed by a computer processor, and have corresponding functions and beneficial effects.

Those skilled in the art should understand that the embodiments of the present disclosure may be provided as a method, a system, or a computer program product.

Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (which may include disk storage, CD-ROM, optical storage, etc.) containing computer-usable program codes. The present disclosure is described with reference to flowcharts and/or block diagrams of methods, devices (systems), and computer program products in embodiments of the present disclosure. It should be understood that each process and/or block in the flowchart and/or block diagram, and the combination of processes and/or blocks in the flowchart and/or block diagram may be implemented by computer program instructions. These computer program instructions may be provided to the processor of a general-purpose computer, a special-purpose computer, an embedded processor, or other programmable data processing equipment to generate a machine, so that with the instructions executed by the processor of the computer or other programmable data processing equipment, a device that is configured to implement the functions specified in one process or multiple processes in the flowchart and/or one block or multiple blocks in the block diagram is generated. These computer program instructions may also be stored in a computer-readable memory that may direct a computer or other programmable data processing equipment to work in a specific manner, so that the instructions stored in the computer-readable memory produce an article of manufacture including the instruction device. The instruction device implements the functions specified in one process or multiple processes in the flowchart and/or one block or multiple blocks in the block diagram. These computer program instructions may also be loaded on a computer or other programmable data processing equipment, so that a series of operation steps are executed on the computer or other programmable equipment to produce computer-implemented processing, thus the instructions executed on the computer or other programmable equipment provide steps for implementing functions specified in a flow or multiple flows in the flowchart and/or a block or multiple blocks in the block diagram.

In a typical configuration, the computing device includes one or more processors (CPUs), input/output interfaces, network interfaces, and memory. The memory may include non-permanent memory, random access memory (RAM) and/or non-volatile memory, etc. in a computer-readable medium, such as read-only memory (ROM) or flash memory (flash RAM). The memory is an example of a computer-readable medium.

Computer-readable storage media include permanent and non-permanent, removable and non-removable media, and information storage may be achieved by any method or technology. The information may be computer-readable instructions, data structures, program modules, or other data. Examples of computer-readable storage media include, but are not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memories, compact disc read-only memory (CD-ROM), digital versatile disc (DVD) or other optical storage, magnetic cassette tape, magnetic disk storage or other magnetic storage devices or any other non-transmission media which may be configured to store information capable of being accessed by computing devices. According to the definition in the present disclosure, computer-readable media does not include transitory media, such as modulated data signals and carrier waves.

It should also be noted that the terms "include," "comprise" or any other variants thereof are intended to cover non-exclusive inclusion, so that a process, method, commodity or equipment including a series of elements not only includes those elements, but also includes other elements that are not explicitly listed, or also include elements inherent to such processes, methods, commodities, or equipment. If there are no more restrictions, the element defined by the sentence "including a . . . " does not exclude the existence of other identical elements in the process, method, commodity, or equipment that includes the element.

It should be noted that the above is only preferred embodiments of the present disclosure and the applied technical principle. Those skilled in the art will understand that the present disclosure is not limited to the specific embodiments described herein, and it is possible for those skilled in the art to make various obvious changes, readjustments and substitutions without departing from the claimed scope of the present disclosure. Therefore, although the present disclosure has been described in more detail through the above embodiments, the present disclosure is not limited to the above embodiments, and may include more equivalent embodiments without departing from the inventive concept. The scope of the present disclosure is determined by the scope of the appended claims.

What is claimed is:

1. A method for recognizing a material, performed by an interactive board, wherein the interactive board comprises:
   an operation panel;
   an infrared touch sensor; and
   an elastic wave sensor, wherein the infrared touch sensor is arranged on at least one edge of the operation panel to form a touch detection region of the interactive board, and the elastic wave sensor is configured to detect vibration of the operation panel and generate an electrical signal, and
   wherein the method comprises:
      generating an infrared blocking electrical signal by the infrared touch sensor from a first moment when a touch object performs a touch operation in the touch detection region;
      generating an original touch electrical signal by the elastic wave sensor from the first moment;
      calculating an average energy value of the original touch electrical signals within a current time window;
      calculating a ratio of the average energy value to an historical average energy value, wherein the historical average energy value is an average energy value of the original touch electrical signals within a previous time window;
      determining whether the ratio is greater than a preset threshold;
      acquiring an initial moment of the current time window as a starting moment of an effective touch electric signal when the ratio is greater than the preset threshold;
      acquiring an effective touch electrical signal within a preset time length after the starting moment as elastic wave data; and
      determining first material information of the touch object based on the infrared blocking electrical signal and the elastic wave data.

2. The method of claim 1, further comprising:
   dynamically updating the preset threshold based on a first electrical signal generated by the infrared touch sensor and a second electrical signal generated by the elastic wave sensor.

3. The method of claim 2, wherein the dynamically updating the preset threshold based on the first electrical signal generated by the infrared touch sensor and the second electrical signal generated by the elastic wave sensor comprises:
   determining in real time whether instantaneous amplitude of the second electrical signal generated by the elastic wave sensor is greater than the preset threshold when it is determined that there is no touch object based on the first electrical signal generated by the infrared touch sensor;
   setting the preset threshold to a first preset threshold when the instantaneous amplitude of the second electrical signal is greater than the preset threshold; and
   setting the preset threshold to a second preset threshold when the instantaneous amplitude of the second electrical signal is less than the preset threshold.

4. The method of claim 1, wherein the determining first material information of the touch object based on the infrared blocking electrical signal and elastic wave data comprises:
   generating probabilities corresponding to different materials based on the elastic wave data;
   adjusting the probabilities based on the infrared blocking electrical signal to obtain a target probability; and
   generating the first material information of the touch object based on the target probability.

5. The method of claim 4, wherein the adjusting the probabilities based on the infrared blocking electrical signal to obtain the target probability comprises:
   calculating an area of the touch object based on the infrared blocking electrical signal;
   determining weights corresponding to different materials based on the area of the touch object; and
   adjusting the probability based on the weight to obtain the target probability.

6. The method of claim 4, wherein the generating probabilities corresponding to different materials based on the elastic wave data comprises:
   preprocessing the elastic wave data to obtain target data; and
   inputting the target data into a preset neural network to obtain probabilities corresponding to different materials.

7. The method of claim 6, wherein the elastic wave data is generated based on the effective contact electrical signals corresponding to multiple elastic wave sensors, and the preprocessing the elastic wave data to obtain the target data comprises:
   performing time-frequency transformation on the elastic wave data of multiple elastic wave sensors to obtain the frequency domain data corresponding to the elastic wave data;
   performing multi-channel signal fusion on frequency domain data to obtain fused data; and
   filtering the fused data to obtain the target data.

8. The method of claim 7, wherein the performing multi-channel signal fusion on frequency domain data to obtain fused data comprises:
   performing weighted averaging on frequency domain data to obtain the fused data.

9. The method of claim 7, wherein the performing multi-channel signal fusion on frequency domain data to obtain fused data comprises:
inputting the frequency domain data into the preset first neural network to obtain fused data.

10. The method of claim 6, wherein the preprocessing elastic wave data to obtain target data comprises:
calculating a system function of elastic waves propagating to respective elastic wave sensors;
dividing the elastic wave data corresponding to each elastic wave sensor by the corresponding system function to obtain the first data corresponding to each elastic wave sensor; and
calculating the average of the first data to obtain the target data.

11. The method of claim 6, wherein the neural network comprises:
a multi-layer fully connected network, further comprising: a first fully connected layer, a second fully connected layer, a third fully connected layer, a first BN layer, a second BN layer, a Dropout layer, and a Softmax layer, wherein the first fully connected layer, the first BN layer, the second fully connected layer, the second BN layer, the Dropout layer, the third fully connected layer, and the Softmax layer are connected in sequence.

12. The method of claim 11, wherein training parameters and weight parameters of the multi-layer fully connected network are obtained by training the multi-layer fully connected network with cross-entropy loss function and Adam optimization algorithm.

13. The method of claim 12, wherein the training parameters and weight parameters are obtained through the following:
collecting the first preset volume of target data as training data, and collecting the second preset volume of target data as validation data;
receiving material labels corresponding to respective training data and validation data;
training the multi-layer fully connected network by using cross-entropy loss function and Adam optimization algorithm based on the rounds, wherein the training data corresponding to the preset data volume is trained in each round, and the corresponding initial network model is obtained by each round of training; and
verifying the initial network model through validation data, confirming that the training parameters and weight parameters of the initial network model are the training parameters and weight parameters of the multi-layer fully connected network when the validation recognition rate of the initial network model reaches a preset indicator, and finishing the training.

14. The method of claim 1, further comprising:
acquiring the infrared blocking electrical signal at the previous moment when the first material information has not been acquired within the first duration after the first moment, and determining whether the current touch operation is associated with the touch operation at the previous moment based on the current infrared blocking electrical signal, and acquiring the corresponding material type at the previous moment as the material type of the touch event when being associated.

15. The method of claim 14, wherein the acquiring the infrared blocking electrical signal at the previous moment and determining whether the current touch operation is associated with the touch operation at the previous moment based on the current infrared blocking electrical signal comprises:
determining a touch point based on the current infrared blocking electrical signal, and determining a historical touch point based on the infrared blocking electrical signal at the previous moment;
calculating a distance between the touch point and the historical touch point, and determining a time interval between the first moment and the previous moment; and
determining that the current touch operation is associated with the touch operation at the previous moment when the distance is less than a preset distance and the time interval is less than a preset time interval.

16. An interactive board, comprising:
an operation panel;
an infrared touch sensor;
an elastic wave sensor; and
at least one processing device, wherein the infrared touch sensor is arranged on at least one edge of the operation panel to form a touch detection region of the interactive board, the elastic wave sensor is configured to detect vibration of the operation panel and generate an electrical signal, and the at least one processing device is configured to:
generate an infrared blocking electrical signal by the infrared touch sensor from a first moment when a touch object performs a touch operation in the touch detection region;
generate an original touch electrical signal by the elastic wave sensor from the first moment;
calculate an average energy value of the original touch electrical signals within a current time window;
calculate a ratio of the average energy value to an historical average energy value, wherein the historical average energy value is an average energy value of the original touch electrical signals within a previous time window;
determine whether the ratio is greater than a preset threshold;
acquire an initial moment of the current time window as a starting moment of an effective touch electric signal when the ratio is greater than the preset threshold;
acquire an effective touch electrical signal within a preset time length after the starting moment as elastic wave data; and
determine first material information of the touch object based on the infrared blocking electrical signal and the elastic wave data.

17. The interactive board of claim 16, wherein a plurality of the elastic wave sensors are directly or indirectly installed on the back of the operation panel.

18. A non-transitory computer-readable storage medium storing computer executable instructions, wherein the computer executable instructions, when executed by a computer processor, cause the computer processor to perform a method for recognizing a material, wherein the method comprises:
generating an infrared blocking electrical signal by an infrared touch sensor of an interactive board from a first moment when a touch object performs a touch operation in a touch detection region of the interactive board;
generating an original touch electrical signal by an elastic wave sensor of the interactive board from the first moment;

calculating an average energy value of the original touch electrical signals within a current time window;

calculating a ratio of the average energy value to an historical average energy value, wherein the historical average energy value is an average energy value of the original touch electrical signals within a previous time window;

determining whether the ratio is greater than a preset threshold;

acquiring an initial moment of the current time window as a starting moment of an effective touch electric signal when the ratio is greater than the preset threshold;

acquiring an effective touch electrical signal within a preset time length after the starting moment as elastic wave data; and determining first material information of the touch object based on the infrared blocking electrical signal and the elastic wave data.

\* \* \* \* \*